United States Patent [19]

Taniguchi et al.

[11] Patent Number: 4,928,124
[45] Date of Patent: May 22, 1990

[54] PHOTOGRAPHIC CAMERA

[75] Inventors: Nobuyuki Taniguchi, Nishinomiya; Takeo Hoda, Kawachinagano; Yoshiaki Hata, Nishinomiya; Manabu Inoue, Kobe; Yoshinobu Kudo, Sakai; Hiroshi Ueda, Toyokawa, all of Japan

[73] Assignee: Minolta Camera Kabushiki Kaisha, Osaka, Japan

[21] Appl. No.: 395,089

[22] Filed: Aug. 17, 1989

Related U.S. Application Data

[60] Division of Ser. No. 348,075, May 5, 1989 which is a continuation of Ser. No. 939,706, Dec. 9, 1986, abandoned.

[30] Foreign Application Priority Data

Dec. 9, 1985 [JP] Japan .................. 60-277584
Dec. 10, 1985 [JP] Japan .................. 60-278586
Dec. 20, 1985 [JP] Japan .................. 60-288366

[51] Int. Cl.$^5$ .................. G03B 3/00; G03B 17/24
[52] U.S. Cl. .................. 354/106; 354/195.1; 354/202
[58] Field of Search .................. 354/195.1, 106, 202

[56] References Cited

U.S. PATENT DOCUMENTS

| | | | |
|---|---|---|---|
| 3,379,485 | 4/1968 | Steisslinger | 350/58 |
| 3,490,844 | 1/1970 | Sapp | 355/40 |
| 3,848,984 | 11/1974 | Kanno | 354/38 |
| 4,107,716 | 8/1978 | Pfefer | 354/296 |
| 4,122,470 | 10/1978 | Loranger et al. | 354/122 |
| 4,245,901 | 1/1981 | Karikawa et al. | 354/43 |
| 4,357,102 | 11/1982 | Taren et al. | 355/77 |
| 4,361,388 | 11/1982 | Mlcak et al. | 354/106 |
| 4,362,369 | 12/1982 | Kazami et al. | 354/106 |
| 4,515,453 | 5/1985 | Wakabayashi et al. | 354/149 |
| 4,583,831 | 4/1986 | Harvey | 354/106 |
| 4,609,269 | 9/1986 | Kamata | 354/149 |
| 4,639,111 | 1/1987 | Harvey | 354/481 |
| 4,647,170 | 3/1987 | Stoneham | 354/275 |
| 4,650,304 | 3/1987 | Harvey | 354/21 |
| 4,652,104 | 3/1987 | Harvey | 354/106 |
| 4,682,870 | 7/1987 | Atkinson | 354/275 |
| 4,733,263 | 3/1988 | Taniguchi et al. | 354/419 |
| 4,780,735 | 10/1988 | Taniguchi et al. | 354/202 |
| 4,814,813 | 3/1989 | Yamamoto et al. | 354/418 |

FOREIGN PATENT DOCUMENTS

| | | |
|---|---|---|
| 17-4107 | 2/1942 | Japan . |
| 54-26721 | 2/1979 | Japan . |
| 55-129321 | 10/1980 | Japan . |
| 58-152227 | 9/1983 | Japan . |
| 59-191020 | 10/1984 | Japan . |
| 59-164037 | 11/1984 | Japan . |
| 59-164043 | 11/1984 | Japan . |
| 59-195601 | 11/1984 | Japan . |
| 60-33546 | 2/1985 | Japan . |
| 60-145428 | 9/1985 | Japan . |

OTHER PUBLICATIONS

Minolta Owners Manual, "AF Zoom Lenses", 1984.

Primary Examiner—Michael L. Gellner
Attorney, Agent, or Firm—Burns, Doane, Swecker & Mathis

[57] ABSTRACT

A changeable focal length photographic camera which may operate in either a real focal length photographing mode or a pseudo focal length photographing mode. A light shielding device shields a portion of the film to be exposed when the pseudo focal length photographing mode is selected.

10 Claims, 16 Drawing Sheets

PHOTOGRAPHIC CAMERA

This application is a divisional of application Ser. No. 348,075, filed May 5, 1989, which is a continuation of Ser. No. 939,706, filed Dec. 9, 1986, now abandoned.

BACKGROUND OF THE INVENTION

1. Field of the Invention

The present invention generally relates to photography and more particularly, to a photographic camera by which an object to be photographed can be taken in a pseudo focal length photographing mode as well as in a real focal length photographing mode. In the pseudo focal length photographing mode, a narrower scope for printing is specified than that in the real focal length photographing mode.

2. Description of the Prior Art

Conventionally, there have been proposed various kinds of the photographic cameras each of which is provided with the photographing lens having changeable focal length and accordingly, a large number of such photographic cameras have been on sale, as products. In the photographic cameras of such kinds, however, a changeable ratio in the focal length is restricted to approximately 1.6 to 1.8 times for the purpose of preventing the camera from being formed in a large size, simplifying a mechanism for changing the focal length, simplifying the design and production of the photographing lens and preventing the camera from being manufactured at a high cost. Consequently, users are not satisfied with the aforementioned changeable ratio, since the effect obtained by changing the focal length is not fully recognized.

On the other hand, the Japanese Patent Laid-open Publication (Tokkaisho) No. 54-26721 discloses a photographic camera having a real focal length photographing mode and a pseudo focal length photographing mode to thereby specify a scope for printing narrower than the scope in the real focal length photographing mode, in which camera an information for trimming, that is, a pseudo focal length photographing information related to the trimming process is recorded on a film used in the case where the pseudo focal length photographing mode is selected. A method called trimming in the field of photography is the method in which only a desired area of an image recorded on a frame is printed with enlargement. The camera of this kind is so constructed that the trimming information (information indicating that the pseudo focal length photographing mode is selected) is printed at the upper or lower portion of the film within a range other than the range to be photographed.

In this camera, although the focal length of the photographing lens can not be switched, it is capable of recording onto a film used, a signal signifying whether or not the print is requested with enlargement in a magnification larger than the ordinary magnification, through the trimming process with respect to the desired portion of the frame of the film which has been photographed. In the case where the film which has been photographed by such camera is printed, the print in compliance with a photographer's intention can be obtained in a manner that the magnification for enlargement is altered by reading the signals recorded on respective frames of the film. By employing such camera, it is capable of obtaining without any switching of the focal length of the photographing lens, through the trimming photography, i.e., the photography in the pseudo focal length photographing mode, the print similar to the print which is obtained through the photographing in the long focal length mode by the photographic camera with the changeable focal lengths. Accordingly, by the photographic camera enabling the trimming photography as disclosed in the aforementioned Publication, since it is not necessary to provide the mechanism for changing the focal length, unlike the focal length changeable camera, the photographic camera having a simple and compact construction can be manufactured advantageously at a low cost.

In the photographic camera that permits to photograph in the pseudo focal length photographing mode, however, since the enlargement is executed in the magnification larger than the ordinary magnification when the photographing in the pseudo focal length photographing mode has been executed, there is inevitably a limit for the possible magnification for enlargement in view of particle characteristics of the film, distance measuring performance of a distance measuring device and optical properties of the photographing lens, and consequently, the magnification is restricted to approximately 2 to 4 times at the utmost in the case where the magnification for enlargement is converted into the magnification in an equivalent focal length of the photographing lens.

With respect to the film on which the pseudo focal length photographing information is printed, since various kinds of data are formed as latent images thereof on the film or the portion of the film on which the pseudo focal length photographing information is printed is the portion on which various data are printed or notches are formed in a developing process, the developing system is subjected to an undesired influence. Furthermore, there has been such a possibility that the pseudo focal length photographing information is lost in the case where the notches are formed on the film in the developing process.

In addition, a correspondence can not be readily made between the print and a negative through respective views thereof, since the pseudo focal length photographing information is printed at the end portion other than the portion on which the image is formed. This is because only a part of the frame of the negative is printed and also, the information indicative of this fact is located at the position to be recognized with difficulty.

In the aforegoing focal length changeable camera, although there has been such an advantage that the photographing can be executed in a large magnification of the image in the case where the photographing lens is set to the longer side in focal length, a shortest distance up to the object for close-up photography is determined, in the photographic camera enabling an automatic adjustment of the focusing position in accordance with a result detected by an automatic focus detecting device, by the range of distance which can be measured by the automatic focus detecting device or by the range of the distance which can be adjusted by an automatic focus adjusting device, and as a result, no photographing can be executed in a magnification larger than that obtained by the above described camera.

Moreover, the focal length changeable camera is also known, for example, in the Japanese Utility Model Laid-Open Publication (Jikkaisho) Nos. 59-164037 and 59-164043, and in the Japanese Patent Laid-Open Publication (Tokkaisho) Nos. 59-191020 and 59-195601, or the like.

SUMMARY OF THE INVENTION

Accordingly, the present invention has been developed with a view to substantially eliminating the above described disadvantages inherent in the prior art photographic camera and has for its essential object to provide an improved photographic camera in which the pseudo focal length photographing information or informations can be correctly read in the developing process.

Another important object of the present invention is to provide a photographic camera of the above described type that permits the photographing in a magnification larger than the magnification obtained by the close-up photography at the aforementioned shortest distance up to the object, with the photographing lens being set at the long side in focal length.

A further object of the present invention is to provide a photographic camera of the above described type which is simple and compact in construction and is provided with the photographing lens changeable in focal length, and in which the changeable magnification of the equivalent focal length showing up in the print can be increased as compared with that of the conventional camera, by means of the combination of the changeable magnification of the focal length and the enlargement magnification in printing the film taken in the pseudo focal length photographing mode.

In accomplishing these and other objects, according to one preferred embodiment of the present invention, there is provided a photographic camera mounting thereon a photographing lens having changeable focal lengths of at least two kinds of a long focal length and a short focal length, and by which camera an object to be photographed can be taken in either real focal length photographing mode or pseudo focal length photographing mode. In the pseudo focal length photographing mode, a narrower scope for printing is specified than that in the real focal length photographing mode. The photographic camera includes means for changing the focusing position of a photographing optical system, a selecting means for selecting either of the real focal length photographing mode and a close-up mode required for close photography, and a setting means for setting the photographing optical system to a longer side in focal length and also for setting the object distance required for photographing to its shortest distance, in the case where the close-up mode is selected.

BRIEF DESCRIPTION OF THE DRAWINGS

These and other objects and features of the present invention will become apparent from the following description taken in conjunction with the preferred embodiment thereof with reference to the accompanying drawings, throughout which like parts are designated by like reference numerals, and in which.

DETAILED DESCRIPTION OF THE PREFERRED EMBODIMENT

Figure 1:
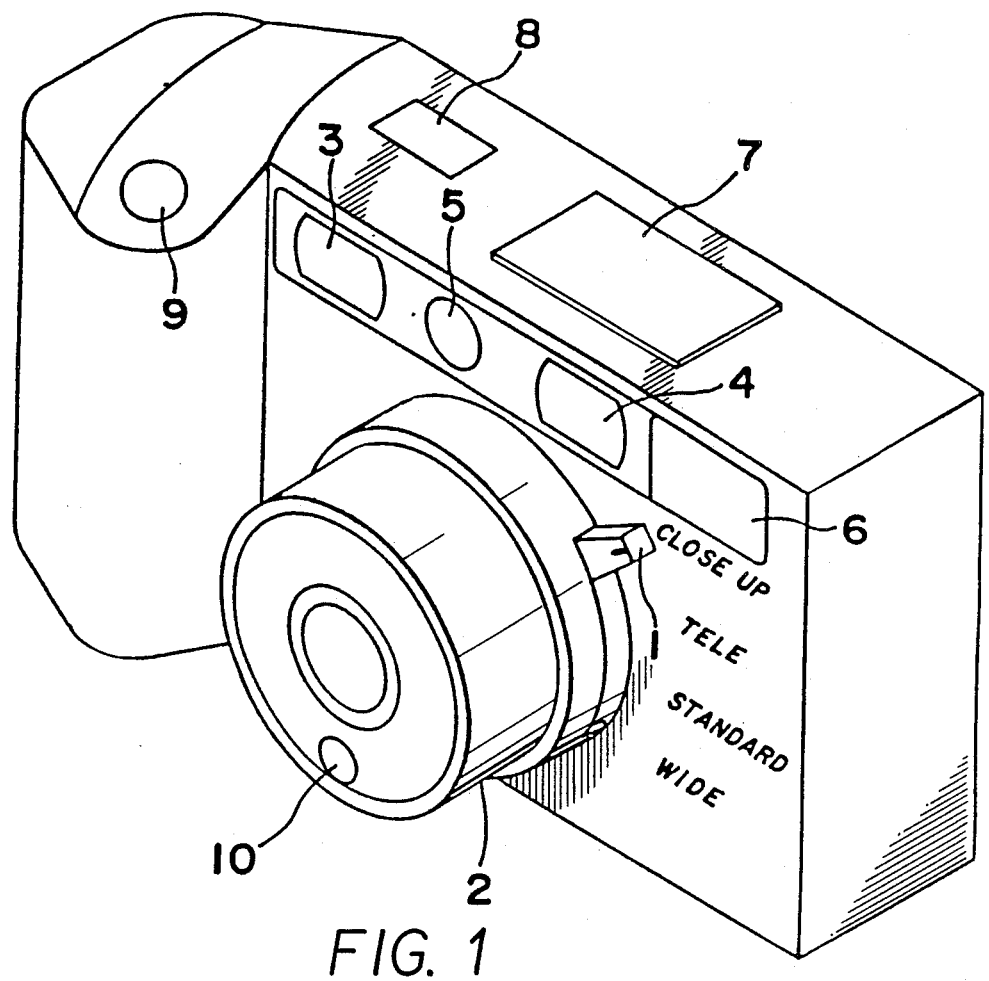
FIG. 1 is a perspective view of a photographic camera according to one preferred embodiment of the present invention.

Referring now to the drawings, there is shown in FIG. 1, a photographic camera according to one preferred embodiment of the present invention which is provided with a switching lever 1 for selectively changing over a photographing mode to another in a plurality of photographing modes, a movable lens barrel 2, a couple of range finder windows 3 and 4 for automatically detecting a distance to an object to be photographed, a view finder 5, an electronic flash 6, a liquid crystal display unit (referred to as LCD for brevity's sake hereinafter), a frame-counter window 8, a shutter release button 9 and a light receiving window for detecting intensity of incidentlight passing therethrough. In the camera of this type, it is capable of selecting one of four modes, i.e. "WIDE" (a wide-angle mode), "STANDARD" (a standard mode), "TELE" (a telephoto mode) and "CLOSE UP" (a close-up mode) by operating the switching lever 1. When either of the telephoto mode and the close-up mode has been selected, that is, the switching lever 1 has been selectively set at either of "TELE" and "CLOSE UP", the movable lens barrel 2 protrudes frontwards from the camera body so that the photographing lens is changed over so as to have a long focal length.

Figure 2:
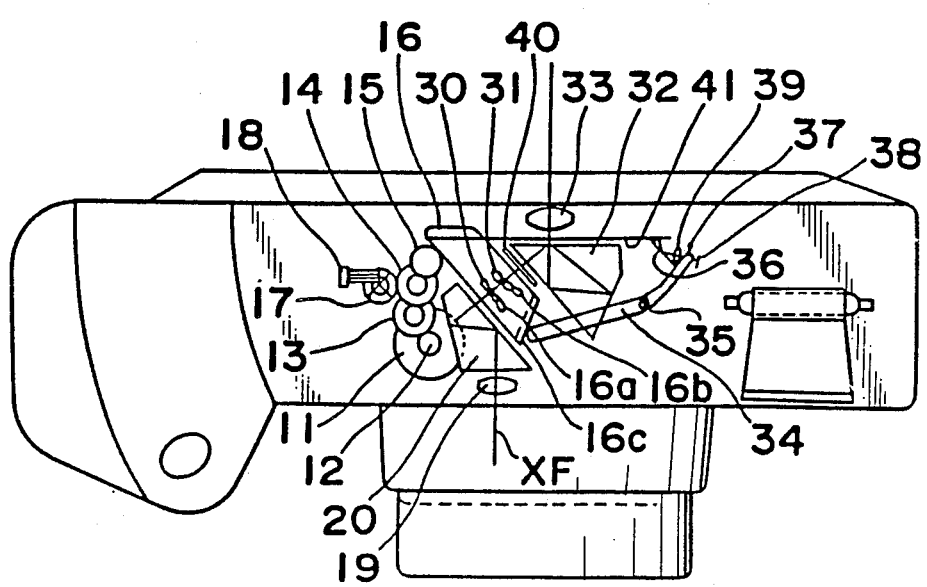
FIG. 2 is a top plan view of a finder portion and a printing portion for a pseudo focal length photographing information in the case where a pseudo focal length photographing mode is selected.

In FIG. 2, a finder portion of the camera and a printing portion thereof for a pseudo focal length photographing signal are schematically illustrated as viewed from above, in the close-up mode for the close-up photography. A finder zoom motor 11 is so provided in the camera as to change over a firder magnification and its rotation is transmitted to a rack plate 16 through a pinion gear 12, a couple of reduction gears 13 and 14 and an idle gear 15. The rack plate 16 is reciprocably so guided as to cross an optical axis XF of the finder through the rotation of the idle gear 15.

Each of a set of finder zoom lenses 30 and 31 is provided with a pin for being engaged in a cam groove 16a and 16b formed in the rack plate 16, respectively. When the rack plate 16 is caused to move in a direction required to cross the optical axis XF of the finder, since both of the zoom lenses 30 and 31 are supported so as to be movable only in an axial direction of the optical axis XF of the finder, they are caused to move in the aforementioned direction in accordance with the movement of the cam grooves 16a and 16b to execute a zooming of the finder. The finder system is further provided with a code plate 17 having 2 bits of Gray codes to monitor a zooming state of the finder, a code reading brush 18 for reading the Gray codes, a finder objective lens 19, a couple of finder prisms 20 and 32, and a finder eyepiece 33.

There are also provided a finder field mask 40 having an opening portion defined therein with the optical axis XF of the finder as the center thereof, and a switching lever 34 of the pseudo focal length photographing signal having one arm portion urged in a clockwise direction with a rotary axis 35 as the center thereof so as to be held in contact at its end with a bent portion 16c of the rack plate 16 and the other arm portion caused to push, at its end, a mask 36 of the pseudo focal length photographing signal urged in a counterclockwise direction. The mask 36 of the pseudo focal length photographing signal is so designed as to enter within a photographing range for a film located at the position required for photographing in order to shield a part of light rays for photographing, with the position to be shielded being set at the location not to be printed in the case where the pseudo focal length photographing mode is selected. The mask 36 of the pseudo focal length photographing signal is rotatable around its rotary axis 37 and there are disposed in the vicinity of this rotary axis 37, a light emitting diode (referred to as LED for brevity's sake hereinafter) 38 for printing use of the pseudo focal length photographing signal and a lens 39 for the same use. By the construction as described above, the light emitted from the LED 38 for printing use of the pseudo focal length photographing signal is collected through the lens 39 and after having been reflected on the mask 36 a single time, it reached the film 41, thus resulting in that the pseudo focal length photographing signal is printed on the film located at the position required for photographing.

Figure 3:
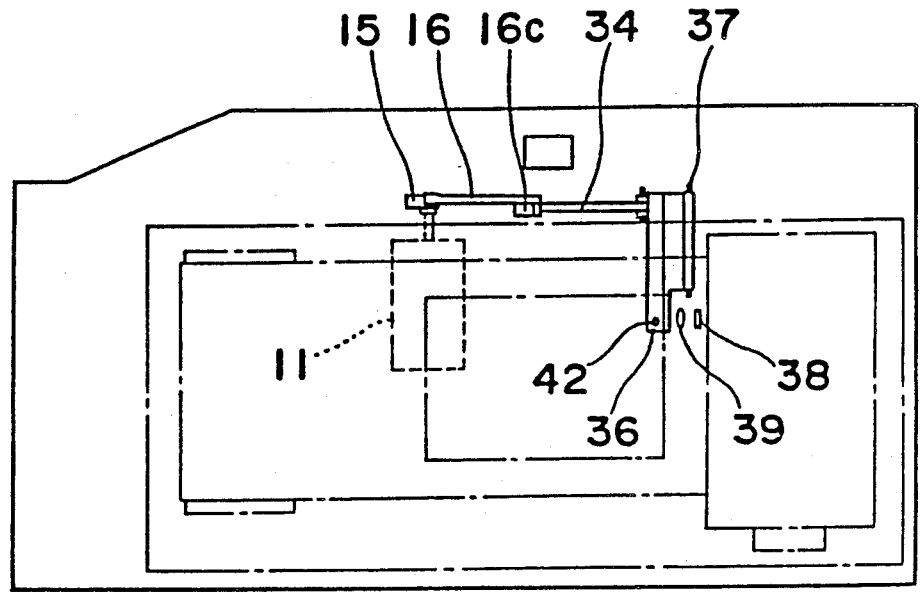
FIG. 3 is a rear view of FIG. 2, with a back cover being opened.

FIG. 3 is a rear view of the camera as viewed from the rear side thereof in the state shown in FIG. 2. In FIG. 3, an opening 42 for printing use of the pseudo focal length photographing signal is defined in the mask 36 in order that the light emitted from the LED 38 reaches the film through the opening 42. As a result, the pseudo focal length photographing signal is printed in the form corresponding to the opening 42 within an image plane to be photographed which is shielded from the light by the mask 36 and a readily distinguishable signal is, therefore, printed on the image plane.

Figure 4:
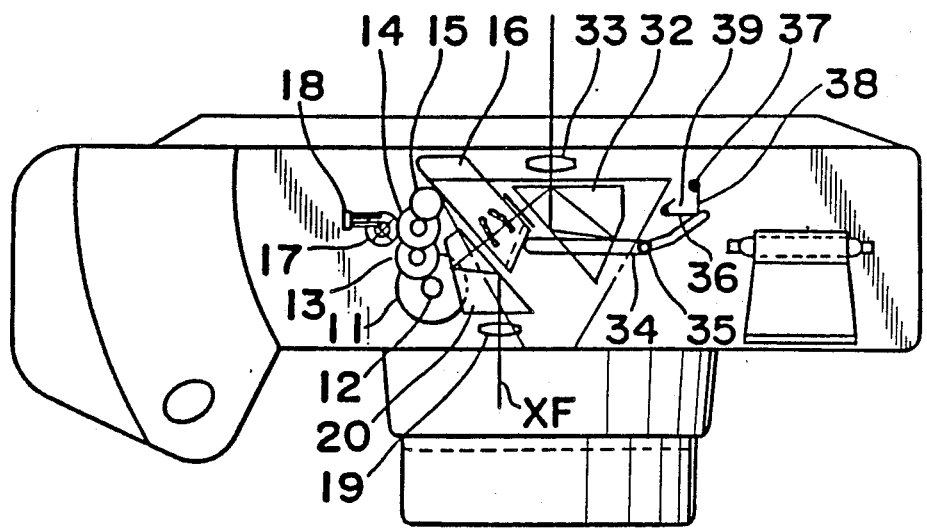
FIG. 4 is a view similar to FIG. 2 in the case where a real focal length photographing mode is selected.

FIG. 4 is a top plan view of the finder portion and the printing portion of the pseudo focal length photographing signal, showing a state in which the switching lever 1 as shown in FIG. 1 is set at "WIDE" in the wide-angle mode, i.e., in a short focal length mode. In this case, since the mask 36 is caused to be away from a photographing light path of the photographing lens, neither the film is shielded from the light nor the pseudo focal length photographing signal is printed.

Figure 5:
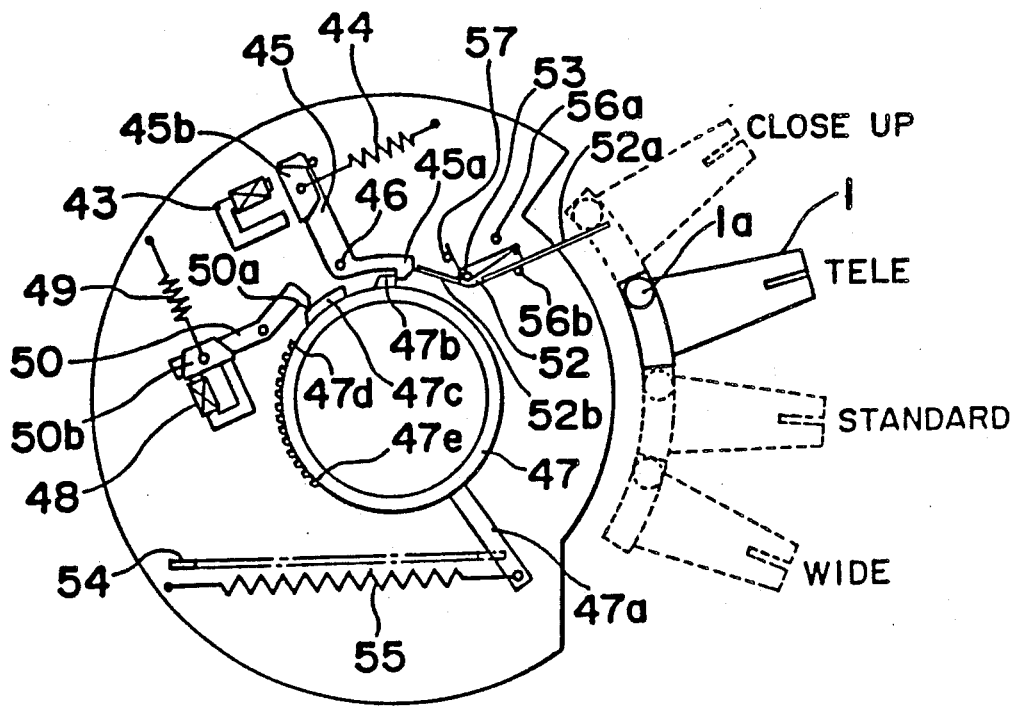
FIG. 5 is an elevational view of a photographing lens control mechanism in one of the modes other than a close up mode.

FIG. 5 is a front view of a control mechanism of the photographing lens in the case where the switching lever 1 as shown in FIG. 1 is set at "TELE" in the telephoto mode, i.e., in a long focal length mode. In FIG. 5, there is provided a circular frame 47 for controlling the position of the photographing lens in the axial direction of the optical axis. When the circular frame 47 is caused to rotate in a counterclockwise direction, the lens is shifted towards the object side for focusing to farther object. A holding lever 45 having one end 45a hooked and the other end covered with an armature 45b thereon is disposed in the vicinity of the circular frame 47 so as to be urged by a spring 44 in a clockwise direction in order to hold the circular frame 47 by its hooked holding portion 45a through engagement thereof with a projection 47b formed on the circular frame 47. A release magnet 43 is disposed close to the armature 45b on the holding lever 45 and at the instance when the release magnet 43 is supplied with electric power to attract the armature 45b thereto, the holding portion 45a of the holding member 45 is disengaged from the projection 47b of the circular frame 47 through rotation of the holding lever 45 around its rotary axis 46 in a counterclockwise direction, thus resulting in that the circular frame 47 is rotated in a clockwise direction by a spring 55 through a bar 47a disposed on the circular frame 47.

When the circular frame 47 rotates to a location corresponding to an in-focus position relating to an object from which the distance has been detected, a stop magnet 48 for restricting the rotation of the circular frame 47 is deenergized to stop it in a manner that a stop lever 50 having one end hooked and the other end covered with an armature 50b, which has been kept attracted by the stop magnet 48, is rotated in a clockwise direction by a spring 49 and thereafter, a holding portion 50a formed on one end of the stop lever 50 is caused to engage with either of a large number of claw members disposed on the outer periphery of the circular frame 47. For this end, the stop lever 50, the stop magnet 48 and the spring 49 are substantially the same both in construction and in arrangement as the holding member 45, the release magnet 43 and the spring 44. The large number of the claw members formed on the circular frame 47 are composed, for use in an automatic focusing adjustable range, of a claw member 47d engaged with the stop lever 50 in the case where the circular frame 47 is caused to stop at a position corresponding to the shortest focusing distance, a claw member 47e engaged with the stop lever 50 in the case where the circular frame 47 is caused to stop at a position corresponding to the longest focusing distance, and the other claw members formed between the aforementioned ones 47d and 47e, each engaged with the stop lever 50 in the case where the circular frame 47 is caused to stop at a position corresponding to an intermediate position between the shortest and the longest focusing distances. A charge member 54 is so disposed as to restore the photographing lens to the primary position where the holding portion 45a of the holding member 45 and the projection 47b of the circular frame 47 are engaged with each other.

There is provided a close-up lever 52 having one arm portion 52a held in contact with either of a stopper 56b and a pin 1a disposed on the switching lever 1, and the other arm portion 52b for restricting the movement of the circular frame 47 through engagement thereof with the projection 47b formed on the circular frame 47. More specifically, the close-up lever 52 is controlled in the counterclockwise rotation thereof by the pin 1a of the switching lever 1 and in either of the photographing modes other than the close-up mode, as shown in FIG. 5, since the close-up lever 52 is not pushed by the pin 1a, the close-up lever 1 is caused to be held in contact at its arm portion 52a with the stopper 56b by being resiliently urged by a spring 57.

Figure 6:
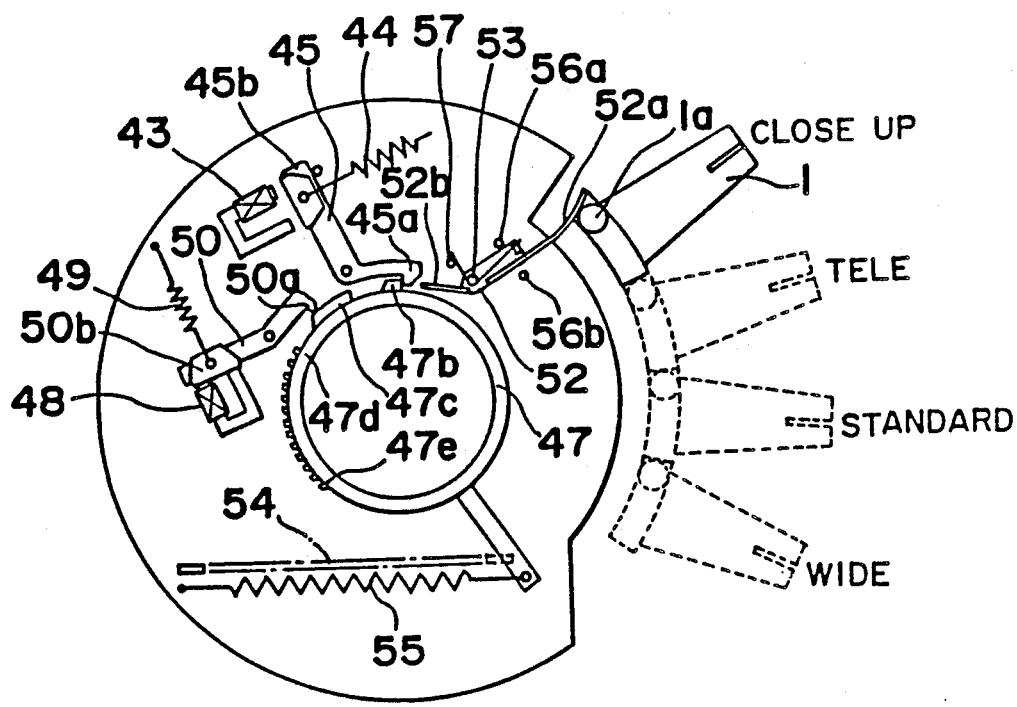
FIG. 6 is a view similar to FIG. 5 in the close-up mode.

FIG. 6 is a front view of the control mechanism of the photographing lens in the case where the switching lever 1 as shown in FIG. 1 is set at "CLOSE-UP" in the close-up mode. When the switching lever 1 is brought to the "CLOSE-UP" position from the state as shown in FIG. 5 by being rotated in the counterclockwise direction, the close-up lever 52 is rotated in the counterclockwise direction by the pin 1a of the switching lever 1. Although the rotation of the close-up lever 52 is interrupted at the position where the arm portion 52b thereof has been brought in contact with the stopper pin 56a, the arm portion 52a of the close-up lever 52 becomes to be bent to some extent due to resiliency of its own, when the close-up lever 1 is rotated to the "CLOSE-UP" position. In this state, the other arm portion 52b of the close-up lever 52 enters within a movable range of the projection 47b formed on the circular frame 47. Consequently, although the circular frame 47 starts to rotate in the clockwise direction at the time when the circular frame 47 is disengaged at its projection 47b from the holding member 45 by energizing the release magnet 43, the rotation of the circular frame 47 is immediately interrupted due to the fact that the close-up lever 52 is brought in contact, at its arm portion 52b, with the projection 47b of the circular frame 47. The photographing lens, in this case, is shifted by a predetermined amount less than an amount in the case where the photographing lens is interrupted when the stop lever 50 is engaged with the claw member 47d for the shortest focusing distance in the automatic focusing adjustable range and accordingly, it is capable of focusing the photographing lens to an object located at a distance closer than a distance within the ordinary automatic focusing adjustable range.

It is to be noted here that in the close-up mode as shown in FIG. 6, the close-up photography may be executed in a manner that the holding lever 45 is locked at its end portion by the arm portion 52b of the close-up lever 52 without any retreat of the photographing lens towards the camera body, that is, with the photographing lens being kept in a completely shifted state.

It is also to be noted that the close-up photography may be executed in a manner that the photographing lens is kept in the completely shifted state without energizing the release magnet 43.

Figure 7:
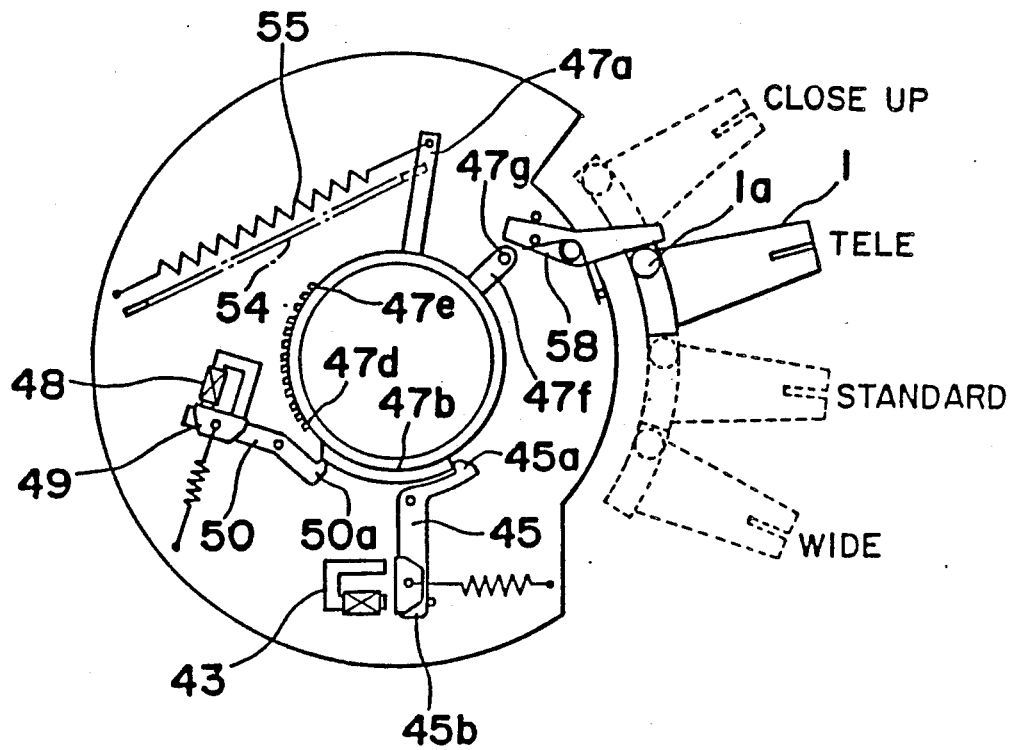
FIGS. 7 and 8 are views similar to FIGS. 5 and 6 respectively, which particularly show modifications thereof.
Figure 8:
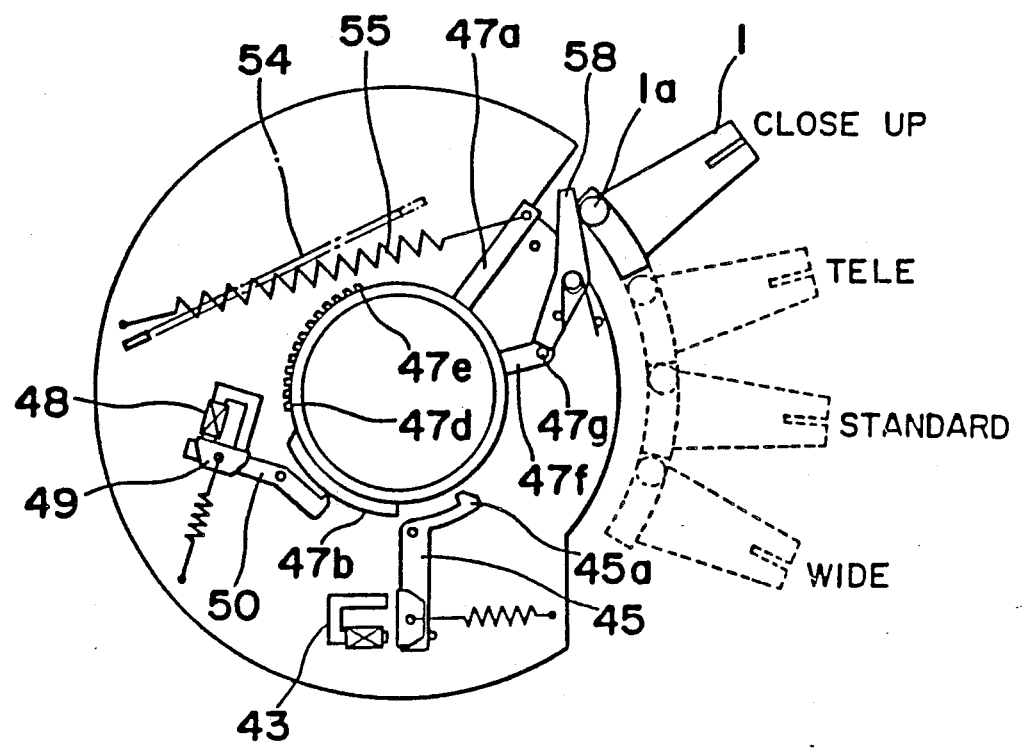

FIGS. 7 and 8 are front views of the control mechanism of the photographing lens showing a modification thereof. In this modification, when the circular frame 47 is rotated in the clockwise direction, the photographing lens is shifted to the object side. In FIG. 7, since the switching lever 1 is set to "TELE", one of the states other than the close-up mode is schematically illustrated therein. On the contrary, FIG. 8 schematically illustrates the state in which the close-up mode is selectively set. In this mode, upon rotation of the switching lever 1 in the counterclockwise direction, a pin 47g disposed on an arm member 47f fixedly mounted on the circular frame 47 is pushed by a lens advancing lever 58 which has been rotated in the counterclockwise direction against the spring 55 and as a result, the circular frame 47 is held after being further rotated in the clockwise direction in addition to the rotation thereof by the charge member 54. By the construction in the above described modification, the close-up photography can be also executed, since the photographing lens is shifted over the ordinary automatic focusing adjustable range.

Figure 9A:
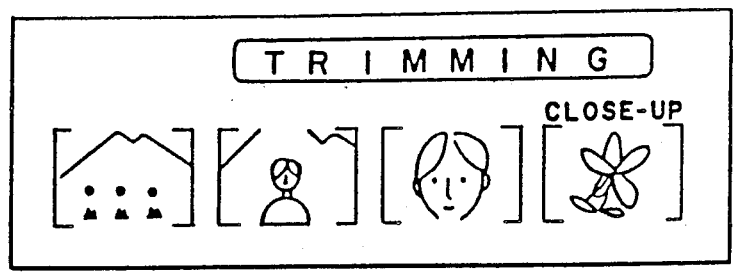
FIGS. 9a through 9d are schematic views illustrating plural kinds of displaying states of a liquid crystal display unit mounted on the photographic camera of the present invention.
Figure 9B:
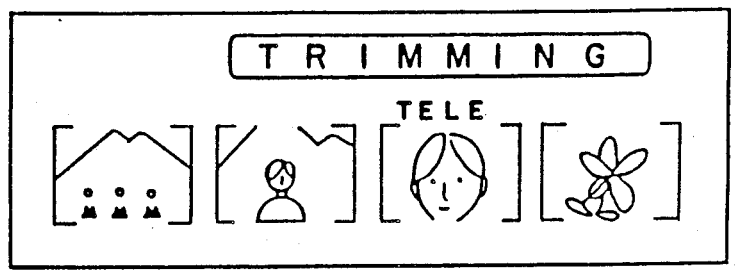
Figure 9C:
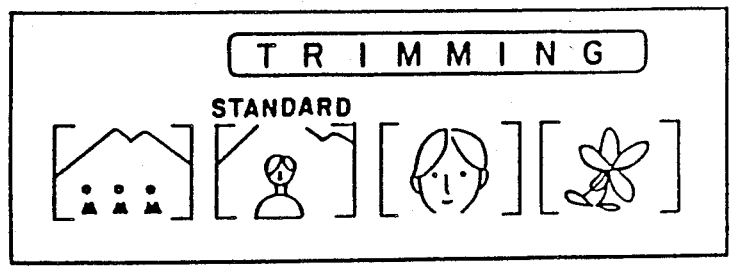
Figure 9D:
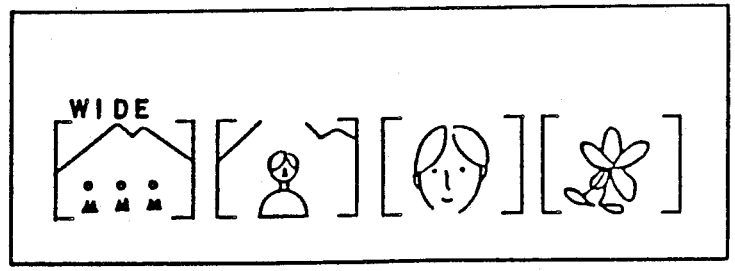

In FIGS. 9a through 9d, a variety of displaying states of the LCD 7 for displaying purpose are illustrated. In FIG. 9a, the switching lever 1 is selectively set to "CLOSE-UP" for enabling the close-up photography to be executed in the close-up mode. In FIG. 9b, the telephoto mode, i.e., the long focal length photographing mode is selected by adjusting the switching lever 1 to "TELE" and in FIG. 9c, the standard mode, i.e., the mean focal length photographing mode is selected by adjusting the switching lever 1 to "STANDARD". In these three modes as described above, the photographing is executed by setting the pseudo focal length photographing mode and the pseudo focal length photographing signal is printed on the film. On the contrary, in FIG. 9d, the switching lever 1 is set to "WIDE" for the purpose of selecting the wide-angle mode, i.e., the short focal length photographing mode, and the pseudo focal length photographing mode signal is not designated only in the case where this mode is selected.

Figure 10:
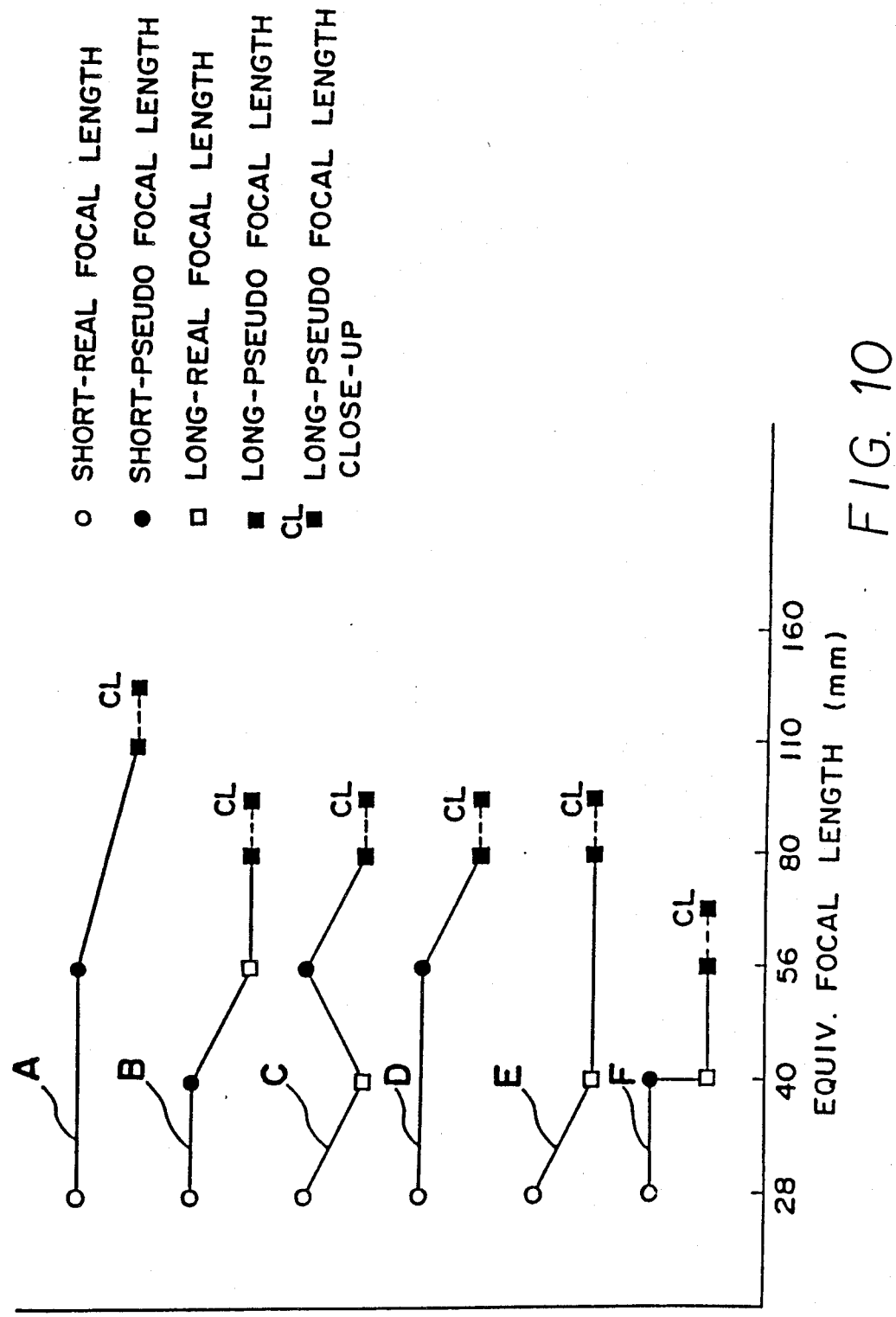
FIG. 10 is a graph showing various combinations between variations of the focal length of the photographing lens and the fact whether or not the pseudo focal length photographing mode is designated.
Figure 11A:
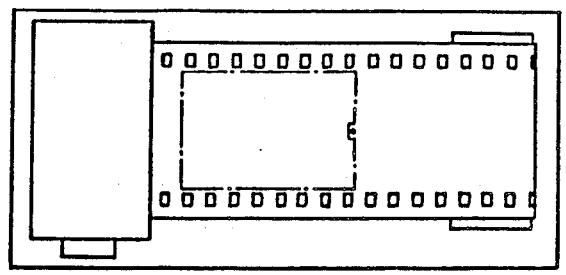
FIGS. 11a through 11d show various locations of the film on each of which the pseudo focal length photographing information is recorded.
Figure 11B:
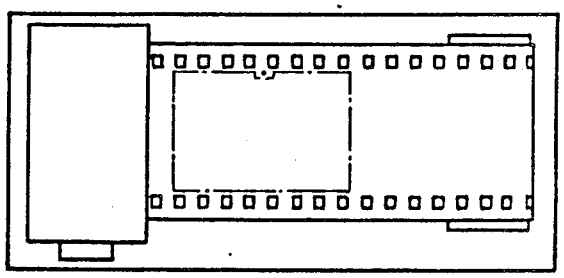
Figure 11C:
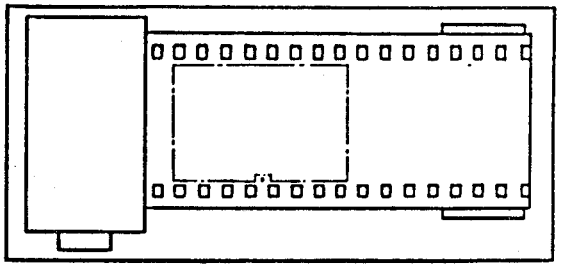
Figure 11D:
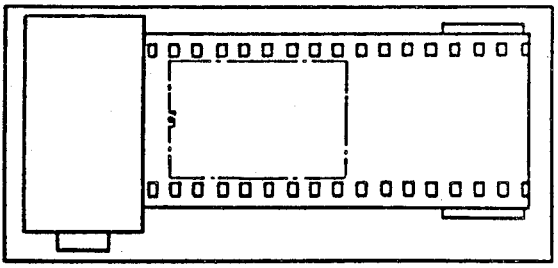

FIG. 10 graphically shows various combinations between variations of the focal length of the photographing lens and the fact whether or not the pseudo focal length photographing mode is designated. A line (A) shows a case where an objective lens having a short focal length of 28 mm and a long focal length of 56 mm in the real focal length photographing mode is used as the photographing lens. Here, if the pseudo focal length photographing mode is selected in the short focal length condition, a print can be obtained equivalent to that photographed by an objective lens having a focal length of 56 mm. Therefore, the objective lens is used as the photographing lens having an equivalent focal length of 56 mm in the short and pseudo focal length photographing mode. Furthermore, if the pseudo focal length photographing mode is selected in the long focal length condition, a print can be obtained equivalent to that photographed by an objective lens having a focal length of 110 mm. The objective lens, therefore, is used as the photographing lens having an equivalent focal length of 110 mm in the long and pseudo focal length photographing mode. As a result, the photographing lens is thereby readily designed and manufactured due to the fact that the photographing lens is required, at the long focal length side, to be secured in image forming performance only within the range to be printed through trimming process. In the close-up photography, a magnification of the image is caused to become large through a close photography by shifting the photographing lens, in the long and pseudo focal length photographing mode, more than the shiftable amount within the ordinary automatic focusing adjustable range. Hereupon, in this example, although the equivalent focal length in the close-up mode is the same as that in the long and pseudo focal length photographing mode, since the large magnification of the image can be obtained in the print through the close-up photography, this case is shown by a dotted line in FIG. 10 in a manner that the equivalent focal length is extended towards the longer side. In the close-up mode, even when the photographing lens is set within the ordinary automatic focusing adjustable range, there is also a method for enabling the focusing to an object located at the distance nearer than the distance within the ordinary automatic focusing adjustable range by emitting the flash light with an aperture of a diaphragm being forcibly caused to be small. It is also available to combine this method and the method for increasing the shifting amount of the photographing lens. The combination of (A) in FIG. 10 is employed in the aforegoing embodiment.

In a combination as shown by a line of (B), an objective lens having a short focal length of 28 mm is used as the photographing lens having the equivalent focal length of 40 mm in the short and pseudo focal length photographing mode. When the photographing lens is changed over to the longer side in focal length, the photographing lens is caused to have the focal length of 56 mm and this photographing lens is used as the lens having the equivalent focal length of 80 mm in the long and pseudo focal length photographing mode. In this case, although the photographing lens becomes to be designed and manufactured with difficulty, the magnification through trimming process is caused to be smaller than that of the aforementioned case (A), and accordingly, such an advantage can be obtained that particles of the film hardly becomes conspicuous.

Moreover, various combinations other than the above described ones are graphically shown by lines of (C), (D), (E) and (F) in FIG. 10.

It is to be noted that if the photographing lens is caused not to have the short focal length of 28 mm but to have the short focal length longer than this length, it is possible to obtain the photographing lens having the long focal length or equivalent focal length longer than that of the above described embodiment.

In the combination as shown by the line of (F), the focal length in the short and pseudo focal length photographing mode is caused to coincide with the equivalent focal length in the long and real focal length photographing mode. This is because when the short and pseudo focal length photographing mode is selected, the photographing with a high shutter speed becomes available due to the fact that an F-number becomes small, thus resulting in that the photographing can be advantageously executed in a dark location or by using a flash device having a small light emitting amount. Furthermore, when the long and real focal length photographing mode is selected, a print having fine particles therein can be obtained and this is especially advantageous in the case where an extremely enlarged photograph is required.

With respect to the image in the finder, it may be so constructed that a known variable magnification finder of a real image type or virtual image type is employed so that the image of the object to be photographed is caused to be changeable in magnification in response to the change-over of the focal length and either of two kinds of large and small frames is selectively displayed in accordance with the fact whether or not the pseudo focal length photographing mode is designated.

By the above described construction, when the small frame is displayed, it is readily appreciated that the pseudo focal length photographing mode is selected in either case where the photographing lens is set to the long focal length side or to the short focal length side. The change-over of the frames can be executed through the change-over on the liquid crystal display unit or that of a mechanical frame mask.

There are shown in FIGS. 11a through 11d, various locations on the film on each of which the pseudo focal length photographing signal is recorded, while the photographic camera is viewed from the rear side thereof with a back cover thereof being opened. In the above described embodiment, although it is so constructed that the image plane to be photographed is shielded from the light at its upper right corner when the photographic camera is viewed from the rear side thereof, as shown in FIG. 3, the present invention is not limited thereby, and it may be so modified that the printing portion of the pseudo focal length photographing signal is provided for the purpose of recording the pseudo focal length photographing signal at the central portion of either of the upper, lower, right and left sides of the image plane to ba photographed as shown in FIGS. 11a through 11d, under a limitation within the range not to be printed in the case where the pseudo focal length photographing mode is designated.

Figure 12:
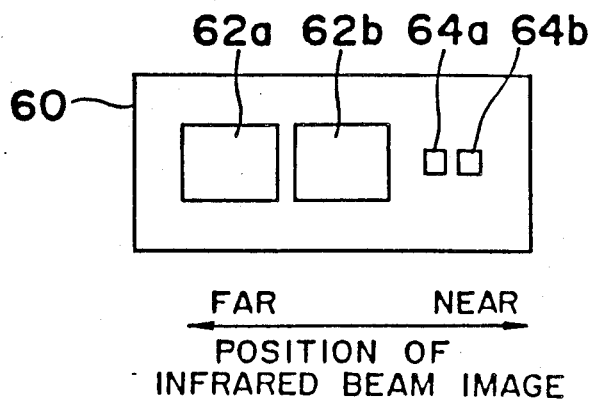
FIG. 12 is an elevational view of a distance measuring unit showing an arrangement of light receiving elements.

FIG. 12 is a front view of a light receiving portion of an automatic distance detecting unit according to this embodiment. The automatic focal length detecting unit in this embodiment has such a construction that a pair of first light receiving elements 62a and 62b are adjacently disposed in a direction of a base length so as to receive the image formed by a reflected light of an infrared light which has been emitted from the camera towards the object to be photographed and the distance up to the object is detected from an output ratio of these two of the first light receiving elements 62a and 62b. The aforementioned first light receiving elements 62a and 62b shown in FIG. 12 are those for automatically detecting the distance up to the object in the ordinary photographing modes. Furthermore, in this embodiment, another pair cf second light receiving elements 64a and 64b are also disposed on one side of the first light receiving elements 62a and 62b for use in the ordinary photographing modes in order to ascertain whether or not the distance up to the object is suitable for the close-up photography, when the close-up mode is selected.

More specifically, there are formed on a base plate 60, two pairs of the first and second light receiving elements 62a, 62b and 64a, 64b, as shown in FIG. 12. The first light receiving elements 62a and 62b are those of the active type distance detecting unit of a known output comparison type of two elements. On the other hand, in case of the close-up mode, the image of the reflected light is formed within the range of the second light receiving elements 64a and 64b and is out of the range of the first light receiving elements 62a and 62b. When the outputs from the second light receiving elements 64a and 64b are equal to each other, it is confirmed that the object measured at this moment is located at the position suitable for the close up photography.

Figure 13:
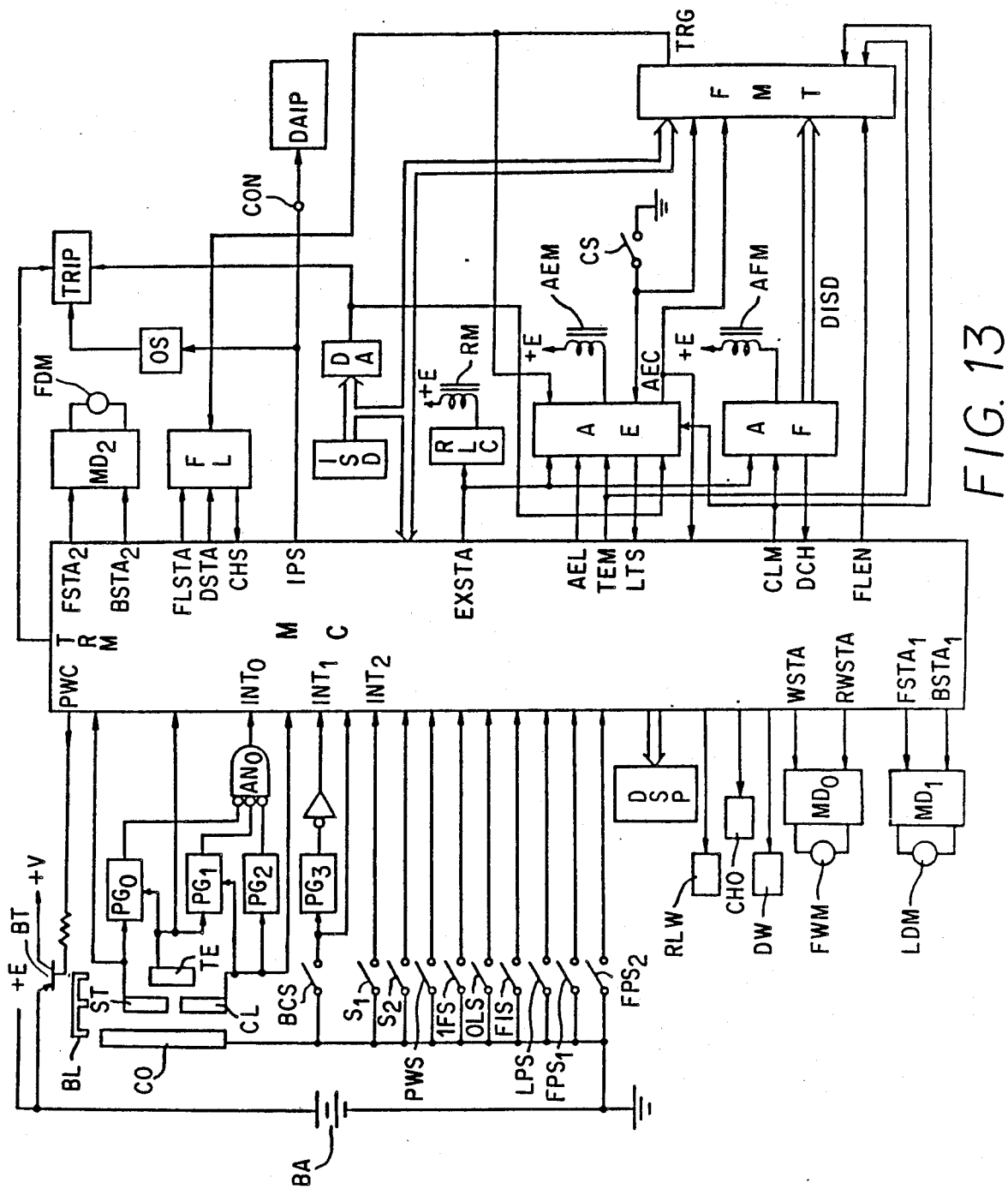
FIG. 13 is a block diagram showing an electric circuit contained in the photographic camera of the present invention.

With reference to FIG. 13, an electric circuit in this embodiment will be explained hereinafter.

There is provided a microcomputer MC to which a power battery BA is connected through a transistor BT and a resistor. More specifically, the power battery BA is connected at its positive electrode to an emitter of the transistor BT so as to supply an electric power thereto, and the transistor BT is also connected at its base to an output terminal PWC of the microcomputer MC through a resistor. When the output terminal PWC of the microcomputer MC is rendered to be "L", the transistor BT becomes conductive and thereafter, the electric power is supplied, through a line (+V) connected to a collector of the transistor BT, to a film sensitivity reading circuit ISD, a D-A converter DA (digital-to-analogue converter), a release circuit RLC, an exposure control circuit AE, an automatic focusing unit AF, an automatically control flash timer FMT, a release lock warning element RLW, a charge completion display element CHC and a close-up distance display element DW for close-up photography. Although the power battery BA is grounded at its negative electrode and is further connected at its positive electrode directly to a release magnet RM, a shutter control magnet AEM and a lens stop magnet AFM to directly supply the electric power thereto. The aforementioned microcomputer MC, plural kinds of circuits, elements and magnets and so forth will be described in detail hereinafter.

A plurality of code plates C0, ST, CL and TE and a slide brush BL are provided in this electric circuit so as to change over a photographing mode to another. Although the first code plate C0 is grounded to the earth, the second code plate ST is connected to the microcomputer MC directly and to an interruption terminal INT0 thereof through a first pulse generator PG0 and an AND circuit AN0. Furthermore, the third code plate CL is connected to the microcomputer MC directly and to the interruption terminal INT0 thereof through a second pulse generator PG1 and the AND circuit AN0, and through a third pulse generator PG2 and the AND circuit AN0. Likewise, the fourth code plate TE is also connected to the microcomputer MC directly and to the interruption terminal INT0 thereof through the first pulse generator PG0 and the AND circuit AN0, and through the second pulse generator PG1 and the AND circuit AN0.

Figure 14:
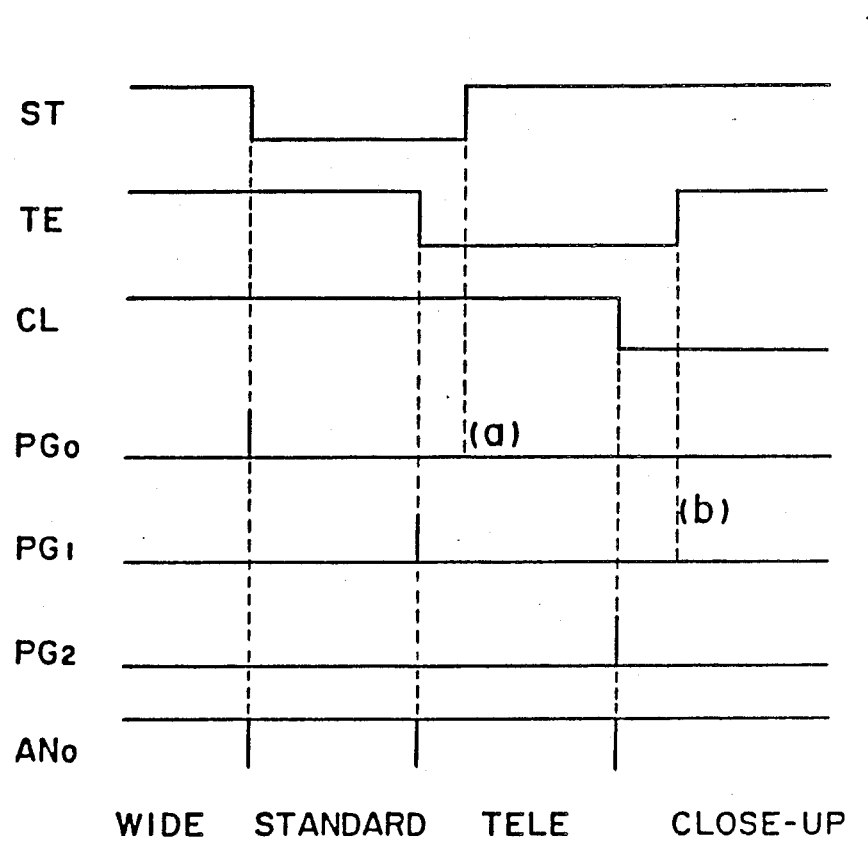
FIG. 14 is a graph showing changes of output signals of code plates caused by a sliding of a slide brush.

The slide brush BL operatively associated with the switching lever 1 slides along the plurality of code plates C0, ST, CL and TE, and when the slide brush BL is moved in turn from the upper side towards the lower side in FIG. 13, a waveform as shown in FIG. 14 is sequentially outputted. Firstly, at the time when the slide brush BL is held in contact only with the first code plate C0 before it comes into contact with the second code plate ST, the switching lever 1 is set to "WIDE", that is, the wide-angle photographing mode is selected. In this state, since each of the code plates ST, TE and CL outputs "H" and each output from the pulse generators PG0, PG1 and PG2 is "L", an output from the AND circuit AN0 is kept to be "L", thus resulting in that none of the interruption signals is applied to the interruption terminal INT0 of the microcomputer MC.

Thereafter, when the slide brush BL comes into contact with the second code plate ST, the output from the second code plate ST is rendered to be "L" and a pulse of "H" is produced from the first pulse generator PG0. Consequently, the interruption signal of "L" from the AND circuit AN0 is inputted into the interruption terminal INT0 and the change-over from the wide-angle photographing mode to the standard photographing mode is transmitted to the microcomputer MC.

When the slide brush BL is further transferred downwards, it comes in contact with the fourth code plate TE, while still kept in contact with the second code plate ST and thereby the output from the fourth code plate TE is rendered to be "L" and the pulse of "H" is outputted from the second pulse generator PG1. As a result, since the interruption signal of "L" is inputted from the AND circuit AN0 into the interruption terminal INT0 of the microcomputer MC, the fact that the photographing mode has been changed over from the standard mode to the telephoto mode is transmitted.

Moreover, when the slide brush BL is still caused to move downwards, the contact relationship between the slide brush BL and the second code plate ST is broken off and the slide brush BL comes in contact with the third code plate CL, while kept in contact with the fourth code plate TE. At this time, the output from the third code plate CL turns to be "L" and the pulse of "H" is produced from the third pulse generator PG2. Accordingly, since the interruption signal of "L" is inputted from the AND circuit AN0 into the interruption terminal INT0, the change-over from the telephoto mode to the close-up mode is transmitted.

As described above, the pulse of "L" from the AND circuit AN0 is inputted as the interruption signal into the interruption terminal INT0 of the microcomputer MC and the operation for switching the photographing mode is executed by the microcomputer MC in response to each of the interruption signals. At the time shown by (a) and (b) in FIG. 14, since each of the outputs from the third and fourth code plates CL and TE is "L", none of the pulses is outputted from the first and second pulse generators PG0 and PG1.

Figures 15, 16:
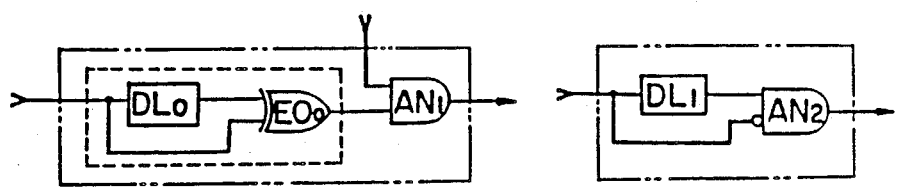
FIG. 15 is a circuit diagram showing a specific construction of one of pulse generators shown in FIG. 13.
FIG. 16 is a circuit diagram showing a specific construction of one-shot circuit shown in FIG. 13.

There is illustrated in FIG. 15, a specific construction of the pulse generator PG0, PG1, PG2 or PG3 as shown in FIG. 13. In FIG. 15, a circuit encircled by a double dotted chain line corresponds to the first or second pulse generator PG0 or PG1 and a circuit encircled by a dotted line corresponds to the third or fourth pulse generator PG2 or PG3. More specifically, each of the first and second pulse generators PG0 and PG1 is composed of a delay circuit DL0, an exclusive OR circuit EO0 and an AND circuit AN1, while the delay circuit DL0 is applied with the output from the second or third code plate ST or CL and the exclusive OR circuit EO0 is applied with the output from the second or third code plate ST or CL at its one input terminal and with the output from the delay circuit DL0 at its other input terminal, and the AND circuit AN1 is applied with the output from the exclusive OR circuit EO0 at its one input terminal and with the output from the fourth code plate TE at its other input terminal.

Each of the third and fourth pulse generator PG2 and PG3 is composed of the delay circuit DL0 and the exclusive OR circuit EO0, while the exclusive OR circuit is applied with an input signal directly at its input terminal and with the same input signal at its other terminal through the exclusive OR circuit EO0. Accordingly, in either of inversions of the input signals from "H" to "L" and from "L" to "H", the pulse of "H" is outputted from each of the pulse generators PG0, PG1, PG2 and PG3.

Referring back to FIG. 13, a back cover switch BCS is grounded at its movable contact and is connected at its stationary contact to the microcomputer MC directly and to an interruption terminal INT1 thereof through the fourth pulse generator PG3 and a diode. A light measuring switch S1, a release switch S2, a preparatory winding switch PWS, a one frame switch 1FS, an overload detecting switch OLS, a film detecting switch FIS, a lens position switch LPS and a set of finder position switches FPS1 and FPS2 are collectively grounded at their movable contacts and are directly coupled to the microcomputer MC at their stationary contacts.

When the back cover is opened, the back cover switch BCS is turned on and on the contrary, when the back cover is closed, the back cover switch BCS is turned off. The light measuring switch S1 and the release switch S2 are turned on respectively at the first and second steps of the depression of the shutter release button 9.

The preparatory winding switch PWS operatively associated with a frame counter (not shown), which mechanically counts the number of the frames photographed, is kept on during the period from the time when the back cover has been closed, i.e., when the counter has been rendered to be "S" till the time immediately before the film has been wound up by three frames so that the counter has been rendered to be "1", and during this period in which the preparatory winding switch PWS is kept on, the preparatory winding of the film is executed so that the film is preparatorily wound up by three frames to the frame capable of being photographed, when the film has been loaded into the camera.

The one frame switch 1FS is turned on in the case where the film has been completely wound up by one frame and is turned off during the winding of the film. The overload detecting switch OLS is turned on when the winding system has been overloaded, i.e., ordinarily when the film has been tensioned in case of winding of the last frame thereof and this switch is turned off when an operation for rewinding the film is initiated.

The film detecting switch FIS is kept off when the film is loaded in the camera and is kept on when the film is not loaded therein. It is so constructed that the rewinding of the film is interrupted when this switch FIS is turned on during the rewinding operation. The count switch CS is turned on at the time when the shutter begins to open. When this switch CS is turned on, not only a count operation for controlling the exposure time is caused to start in the exposure control circuit AE explained in detail hereinafter, but also another count operation of the timer for controlling a timing for flash emission is caused to start in a timer circuit of the automatically control flash timer FMT.

The lens position switch LPS is the switch for indicating the position of the lens in the axial direction of the optical axis of the photographing lens. The lens position switch LPS is kept on, when the movable lens barrel 2 as shown in FIG. 1 is protruding from the camera body in either of the telephoto mode and the close-up mode and on the contrary, this switch LPS is kept off, when the movable lens barrel 2 is not protruding from the camera body in either of the wide angle mode and the standard mode. The first and second finder position switches FPS1 and FPS2 correspond to the code plate 17 and the code reading brush 18 shown in FIG. 2, respectively. Table 1 shows relationships among the on off state of the switches LPS, FPS1 and FPS2, each photographing mode and the fact whether or not the pseudo focal length photographing mode is designated. It can be readily appreciated through recognition of the on off state of each of the switches LPS, FPS1 and FPS2 that either one of the wide angle mode (WP), standard mode (STP), telephoto mode (TEP) and close-up mode (CLP) has been selected.

(TABLE 1)

| Photographing Mode | LPS | FPS1 | FPS2 | Pseudo mode |
|---|---|---|---|---|
| Wide Angle (WP) | OFF | OFF | OFF | NO |
| Standard (STP) | OFF | OFF | ON | YES |
| Telephoto (TEP) | ON | ON | ON | YES |
| Close-Up (CLP) | ON | ON | OFF | YES |

The liquid crystal display unit DSP connected to the microcomputer MC displays data therefrom and corresponds to the liquid crystal display unit 7 shown in FIG. 1. The release lock warning element RLW. charge completion display element CHC and close-up distance display element DW are connected to respective output terminals of the microcomputer MC so as to display in the finder. More specifically, the release lock warning element RLW is provided for warning a state in which the shutter release button is locked and the charge completion display element CHC is provided for displaying a state in which a main capacitor of a flash circuit FL has been completely charged and furthermore, the close-up distance display element DW is provided for indicating whether or not the distance up to the object to be photographed is suitable for the close-up photography in the case where the close-up mode is selected.

A film winding motor FWM is coupled to a first motor control circuit MD0 coupled to output terminals WSTA and RWSTA of the microcomputer MC. Likewise, a lens driving motor LDM is coupled to a second motor control circuit MD1 coupled to output terminals FSTA1 and BSTA1 of the microcomputer MC, and a finder driving motor FDM is coupled to a third motor control circuit MD2 coupled to the microcomputer MC through output terminals FSTA2 and BSTA2 thereof. The film winding motor FWM is controlled by the first motor control circuit MD0 so as to wind up or rewind the film. When the output terminal WSTA of the microcomputer MC is "L", the first motor control circuit MD0 controls the film winding motor FWM so as to wind up the film and on the contrary, when the output terminal RWSTA of the microcomputer MC is "L", the first motor control circuit MD0 controls the film winding motor FWM so as to rewind the film.

The lens driving motor LDM is operated to change the real focal length of the photographing lens. More specifically, the lens driving motor LDM has a function for driving the photographing lens towards the high magnification side (the long focal length side) in the case where the output terminal FSTA1 of the microcomputer MC is "L" and towards the low magnification side (the short focal length side) in the case where the output terminal BSTA1 thereof is "L". The finder driving motor FDM is operated to change the magnification of the finder in compliance with the change of the real focal length of the photographing lens, that is, the finder driving motor FDM is operated so as to change the magnification of the finder towards the high magnification side in the case where the output terminal FSTA2 of the microcomputer MC is "L" and towards the low magnification side in the case where the output terminal BSTA2 thereof is "L".

The flash circuit FL for controlling the electronic flash 6 shown in FIG. 1 is connected to the microcomputer MC through output terminals FLSTA and DSTA thereof and an output terminal CHS of the flash circuit FL. The flash circuit FL is further connected to an output terminal TRG of the automatically control flash timer FMT in order to cause the electronic flash 6 to emit the flash light by receiving a signal therefrom. In this circuit, a voltage boosting is commenced to charge the main capacitor for flash emission, when the output terminal FLSTA of the microcomputer MC is rendered to be "L", and the charged state of the main capacitor is detected when the output terminal DSTA of the microcomputer MC is rendered to be "L". The signal of "H" or "L" is outputted from the output terminal CHS of the flash circuit FL into the microcomputer MC, respectively when the main capacitor has been completely charged or when it is not still fully charged.

There is also provided a printing circuit TRIP of the pseudo focal length photographing mark, a one-shot circuit OS and a data printing unit DAIP. The printing circuit TRIP is connected to an output terminal TRM of the microcomputer MC, to an output terminal IPS thereof through the one-shot circuit OS and to the film sensitivity reading circuit ISD through the D-A converter DA. The film sensitivity reading circuit ISD is further connected to the microcomputer MC and to the automatically control flash timer FMT. The data printing unit DAIP is connected to the output terminal IPS of the microcomputer MC through a connector CON.

When the photographing node is set in the pseudo focal length photographing mode in case of the selection of either of the standard mode, telephoto mode and close-up mode, the printing circuit TRIP for the pseudo focal length photographing mark comes into an operable state due to the fact that the output terminal TRM of the microcomputer MC is rendered to be "L". In this state, in response to a negative edge of the data printing signal outputted from the output terminal IPS of the microcomputer MC, a pulse is outputted from the one-shot circuit OS as specifically shown in FIG. 16 and this results in that the printing circuit TRIP starts the printing operation. The one shot circuit OS is composed, as shown in FIG. 16, of a delay circuit DL1 and an AND circuit AN2 which is applied with an input signal at its one input terminal and the same signal at its other input terminal through the delay circuit DL1. The printing circuit TRIP is applied with an input signal converted through the D-A converter DA into an analogue value from a data corresponding to the film sensitivity, which data is sent from the film sensitivity reading circuit ISD, and the printing operation is executed during a period corresponding to the film sensitivity which has been read.

The data of the film sensitivity sent from the film sensitivity reading circuit ISD is also inputted as the signal in the digital form into the microcomputer MC and the automatically control flash timer FMT without any conversion thereof.

The data printing unit DAIP provided on the back cover of the camera is so constructed as to print a predetermined data from the real surface of the film and is applied with a printing signal outputted from the output terminal IPS of the microcomputer MC through the connector CON. This printing signal is rendered to be "L" with the commencement of the exposure control operation and is turned to be "H" after a lapse of time corresponding to the film sensitivity sent from the film sensitivity reading circuit ISD, and the data printing unit DAIP executes the printing operation only during the period in which this printing signal is kept to be "L". This data printing unit DAIP includes a clock circuit to be used for a calendar function, a liquid crystal display portion for printing and monitoring the data to be printed, a light source for printing, a source battery therefor and the like.

Referring further to FIG. 13, an output terminal EXSTA of the microcomputer MC is connected to the release circuit RLC coupled to the release magnet RM, to the exposure control circuit AE coupled to the shutter control magnet AEM and to the automatic focusing unit AF coupled to the lens stop magnet AFM. The exposure control circuit AE is connected to the microcomputer MC through output terminals AEL and TEM and an input terminal LTS thereof, and to the film sensitivity reading circuit ISD through the D-A convertor DA. The exposure control circuit AE is further directly connected, through an output terminal AEC thereof, to the microcomputer MC and the automatically control flash timer FMT and is also connected to a count switch CS at its movable contact and the automatically control flash timer FMT through the output terminal TRG thereof, with the count switch CS being grounded at its stationary contact. An output terminal CLM of the microcomputer MC is connected to the exposure control circuit AE, the automatic focusing unit AF and the automatically control flash timer FMT. Moreover, the automatic focusing unit AF is coupled to an input terminal DCH of the microcomputer MC and the automatically control flash timer FMT through a data line DISD. In addition, the automatically control flash timer FMT is further coupled to the count switch CS at its movable contact and to the microcomputer MC through the output terminal TEM and an output terminal FLEN thereof.

The release circuit RLC initiates the shifting of the photographing lens through releasement from the engaged state thereof by energizing the shutter release magnet RM corresponding to the release magnet 43 shown in FIG. 5, when the output terminal EXSTA of the microcomputer MC is rendered to be "L".

At the same time, a closing operation of the shutter is interrupted by the shutter control magnet AEM energized by the exposure control circuit AE. Hereupon, in this embodiment, the release magnet RM is operated so that the shifting of the photographing lens is initiated and simultaneously, an advanced traveling plate (not shown) starts to move. Although the shifting of the lens is interrupted at the position corresponding to a result of the measured distance, the advanced traveling plate continues to travel until it releases the engagement of the shutter releasing member at its end position. Thereafter, upon commencement of the shutter opening operation, the count switch CS is turned on.

When the aforementioned transistor BT becomes conductive, it is commenced to supply the electric power to the exposure control circuit AE through the line (+V) and this results in that the light measuring operation is initiated. The exposure value Ev is outputted with addition of both of the brightness value Bv of the measured light and the value Sv of the film sensitivity from the D-A converter DA. Upon lapse of a period to be required from the time when it is commenced to supply the electric power from the line (+V) till the time when the light measuring unit provided in the exposure control circuit AE is stabilized, when the output terminal AEL of the microcomputer MC is rendered to be "L", the exposure value Ev at this time is latched in the exposure control circuit AE through A-D conversion thereof (This is called "AE-lock".).

On the other hand, the exposure control circuit AE contains an encoder for outputting pulses which is operatively associated with the movement of the shutter and these pulses are counted by a counter (not shown) which is brought into an active state by the closure of the count switch CS, thus resulting in that the exposure value Ev determined by the aperture of the diaphragm at that time is outputted. When the exposure value subjected to the AE-lock and the counted value become to be coincident with each other, the shutter is closed through de-energizing of the shutter control magnet AEM. In this embodiment, when the focal length of the photographing lens is doubled, the aperture value decreases by two steps even in case of the same aperture of the diaphragm. Furthermore, the shutter speed is limited from its lowest value of 1/30 to prevent a camera blur, to its highest value of 1/500 which is restricted by the construction of the shutter. Accordingly, as shown in a program diagram of FIG. 17, the exposure value Ev and the shutter speed are different in the operative range associated with each other, between in case of either of the wide-angle mode and standard mode and in case of the telephoto mode. Therefore, when the exposure value Ev subjected to the AE-lock is smaller than "8" in case of either of the wide-angle mode and standard mode, i.e., in case of the short focal length mode, or when this exposure value Ev is smaller than "10" in case of the telephoto mode, i.e., in case of the long focal length mode, the output terminal LTS of the exposure control circuit AE is rendered to be "L" in order to indicate the lowest limit of the shutter speed. More specifically, when the output terminal TEM of the microcomputer MC is "H" in either of the wide-angle mode, standard mode and close-up mode, a comparison is made between the exposure value Ev subjected to the AE-lock and a data corresponding to the exposure value of "Ev=8" and on the other hand, when the output terminal TEM is "L" in the telephoto mode, the comparison is made between the exposure value subjected to the AE-lock and a data corresponding to the exposure value of "Ev=10". Consequently, when the exposure value Ev subjected to the AE-lock is smaller than the predetermined value of "Ev=8" or "Ev=10" with which the exposure value of the former is compared, the output terminal LTS of the exposure control circuit AE is rendered to be "L". At this stage, when the input terminal LTS of the microcomputer MC is rendered to be "L", the natural light photographing mode is switched to the flash light photographing mode. This signal from the input terminal LTS is of no use in the close-up mode.

Figure 18:
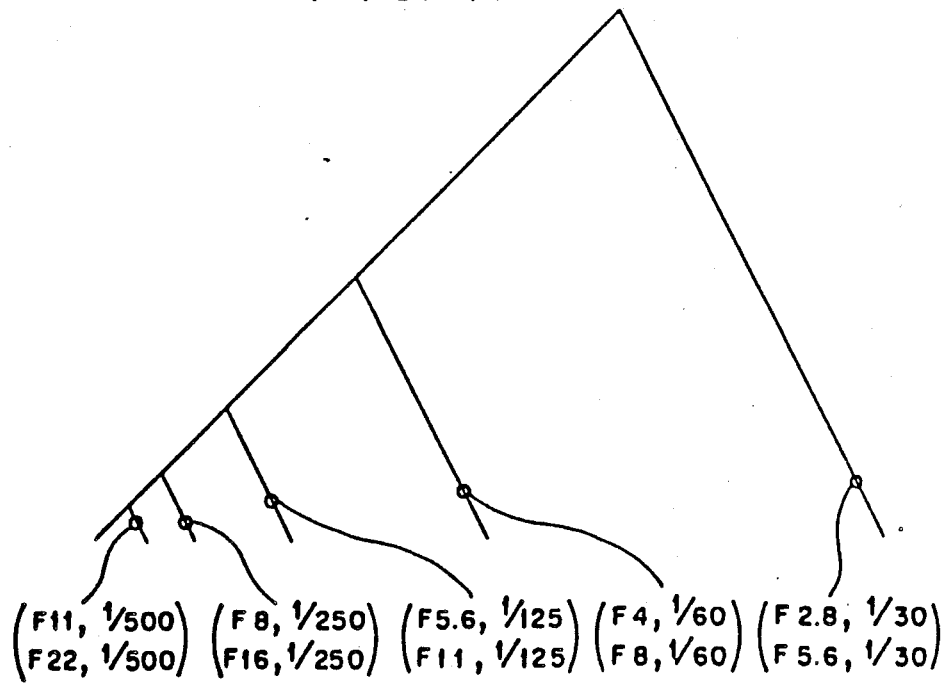
FIG. 18 is a waveform, in accordance with which a shutter of the photographic camera is opened and closed.

Subsequently, the shutter control operation will be explained hereinafter. The shutter is opened or closed in accordance with a waveform as shown in FIG. 18. When the output terminal TEM of the microcomputer MC is "H", a data corresponding to "Ev=16" is preliminarily set in the counter before the opening of the shutter and on the contrary, when the output terminal TEM is "L", another data corresponding to "Ev=18" is preliminarily set in the counter. Thereafter, when the count switch CS is turned on upon commencement of the opening of the shutter, not only the counting by the counter is caused to be operable, but also the driving circuit for de-energizing the shutter control magnet AEM is caused to be operable. When it has been judged that the data in the counter is equal to or smaller than the exposure value Ev subjected to the AE-lock through a comparison between the latter and the data of the former which has been counted down by turns from the value set preliminarily in accordance with the pulse outputted from the encoder operatively associated with the shutter, the closing of the shutter is initiated by the shutter control magnet AEM which has been de-energized.

When the exposure value Ev subjected to the AE-lock is smaller than "8" or "10", the data subjected to the AE-lock is set anew to "Ev=8" or "Ev=10". Thereby, the flash photography is executed by restricting the aperture value and the shutter speed to F2.8 and 1/30 respectively, or F5.6 and 1/30 respectively, as shown in the program diagrams of FIGS. 17 and 18.

Furthermore, in the case where the exposure value Ev subjected to the AE-lock is greater than "16" or "18", when the count switch CS has been turned on after the commencement of the opening of the shutter, the shutter control magnet AEM is immediately de-energized and thereafter, the operation for closing the shutter is initiated. The shutter is, however, opened and closed in accordance with the waveform as shown by the aperture value of F11 and the shutter speed of 1/500 or the aperture value of F22 and the shutter speed of 1/500 in FIG. 18, due to a response delay of the shutter control magnet AEM, a delay of mechanical portions or the like. Accordingly, in the case where the exposure value Ev subjected to the AE-lock is greater than "16" or "18", the shutter speed is limited up to 1/500 at the high speed side. Furthermore, when the shutter control magnet AEM has been de-energized, the "L" pulse having a predetermined width of time is outputted from the output terminal AEC of the exposure control circuit AE and is sent to the microcomputer MC and the automatically control flash timer FMT.

When the transistor BT becomes conductive to initiate the electric supply to the automatic focusing unit AF from the line (+V), the pulse light is emitted from the infrared light emitting diode towards the object to be photographed and the pulse light reflected by the object is received somewhere between the pair of the light receiving elements 62a and 62b shown in FIG. 12. In the outputs from the pair of the light receiving elements 62a and 62b, the signal corresponding to a ratio of light amounts of the pulse lights received thereby, which signal indicates the distance up to the object to be photographed, is sampled and held in compliance with the timing of emission of the pulse light. The signal which has been sampled and held is latched through A-D conversion thereof (This is called AF-lock.). The data corresponding to the distance up to the object which has been subjected to the AF-lock is sent to the automatically control flash timer FMT through the data line DISD.

In case of the close-up mode, the output terminal CLM of the microcomputer MC is rendered to be "L" and it is judged whether or not the pulse light has been received between the pair of the light receiving elements 64a and 64b shown in FIG. 12. More specifically, it is judged whether or not, in the outputs from the light receiving elements 64a and 64b at the time of emission of the pulse light, a ratio of components of the pulse lights is within a predetermined range, i.e., within a permissible range of the distance designed for the photographing lens in the close-up mode. When this ratio is out of the predetermined range, the output terminal DCH is rendered to be "L". When the input terminal DCH of the microcomputer MC is "H", the close-up distance display element DW for the close-up photography displays that the distance up to the object is suitable for the close-up photography and on the contrary, when the input terminal DCH is "L", the close-up distance display element DW never display that the distance is suitable for the close-up photography but inform this result to the user.

When the output terminal EXSTA of the microcomputer MC is rendered to be "L", upon commencement of the shifting of the photographing lens by energizing the release magnet RM corresponding to the magnet 43 shown in FIG. 5 in the release circuit RLC, pulses are outputted from an encoder (not shown) with the shifting of the lens. At the same time, however, since the output terminal EXSTA of the microcomputer MC is rendered to be "L", the lens stop magnet AFM corresponding to the magnet 48 shown in FIG. 5 is also energized. When the data subjected to the AF-lock has coincided with the count data of the pulses from the encoder, the automatic focusing unit AF de-energizes the lens stop magnet AFM to stop the shifting of the lens. Hereupon, in case of the close-up mode, i.e., when the output terminal CLM of the microcomputer MC is "L", the lens stop magnet AFM is kept in the de-energized state even if the output terminal EXSTA of the microcomputer MC is rendered to be "L".

The automatically control flash timer FMT outputs into the flash circuit FL by decoding the data of time corresponding to the emission amount of the flash light in accordance with the data of the film sensitivity from the film sensitivity reading circuit ISD and the data of the distance up to the object from the automatic focusing unit AF and thereafter, when the count switch CS is turned on, the counting of the time which has been decoded is initiated in the automatically control flash timer FMT. Furthermore, when it has been counted to the counting amount corresponding to the time decoded, the automatically control flash timer FMT outputs the "L" pulse from the output terminal TRG thereof and sends the signal for the flash light emission to the flash circuit FL to emit the electronic flash 6. As a result, the electronic flash 6 is caused to emit the flash light at the time when the aperture of the diaphragm has been brought to the aperture value required for the proper exposure determined by the film sensitivity, distance up to the object and emission amount of the flash light. The automatically control flash timer FMT is, however, controlled by the signal sent from the output terminal FLEN of the microcomputer MC and is operated in the case where the output terminal FLEN is rendered to be "L".

Figure 17:
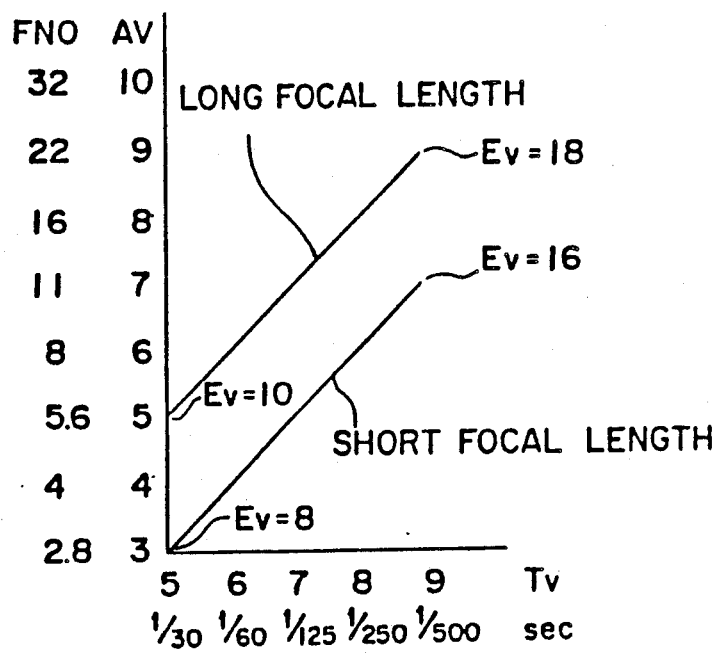
FIG. 17 is a graph showing an exposure control program according to the embodiment of the present invention.

The aperture value in case of the telephoto mode is different by two steps from that in case of the wide-angle mode or standard mode, as shown in FIG. 17, even if the same aperture of the diaphragm or the same shutter speed is set in these two modes. Accordingly, the automatically control flash timer FMT decodes so that the signal for emitting the flash light is outputted, in the telephoto mode in which the output terminal TEM of the microcomputer MC is "L", at the time delayed by two steps, i.e., at the time the aperture of the diaphragm has been further opened by two steps, as compared wit the time in the wide-angle mode or standard mode in which the output terminal TEM is "H", even in the case where the film sensitivity and distance up to the object are same in these modes. For this end, the output terminal TEM of the microcomputer MC is also connected to the automatically control flash timer FMT and the fact whether or not the telephoto mode is set is transmitted to the automatically control flash timer FMT.

Moreover, as the shutter speed is limited to 1/30 in the case where the proper aperture value is smaller than F2.8 or F5.6, for example, the object is located at the long distance, the shutter control magnet AEM is de-energized immediately before completion of the counting of the data decoded by the automatically control flash timer FMT, thus resulting in that the pulse of "L" is outputted from the output terminal AEC of the exposure control circuit AE. In the above described manner, when the pulse of "L" has been inputted into the automatically control flash timer FMT from the output terminal AEC of the exposure control circuit AE before completion of the counting of the timer, the automatically control flash timer FMT outputs this pulse from the output terminal TRG thereof to enable the flash light to be emitted.

In addition, when the output terminal CLM of the microcomputer MC is "L" in the close-up mode, the automatically control flash timer FMT decodes the data predetermined so as to obtain a proper exposure amount in accordance with the light emission amount, distance designed for the photographing lens, and the film sensitivity. Upon completion of the counting by the timer, the pulse is outputted into the output terminal TRG of the automatically control flash timer FMT to enable the flash light to be emitted. In the close-up mode, the operation for controlling the shutter is not executed in the exposure control circuit AE and the shutter control magnet AEM is kept in the energized condition. When the pulse of "L" is applied to the exposure control circuit AE from the output terminal TRG of the automatically control flash timer FMT, the exposure control circuit AE de-energizes the shutter control magnet AEM to close the shutter. In other words, in the close-up mode, the exposure is only automatically controlled on the basis of the distance for photography which is fixedly determined in advance through designing of the lens and accordingly, the natural light photography is never executed.

Figure 19A:
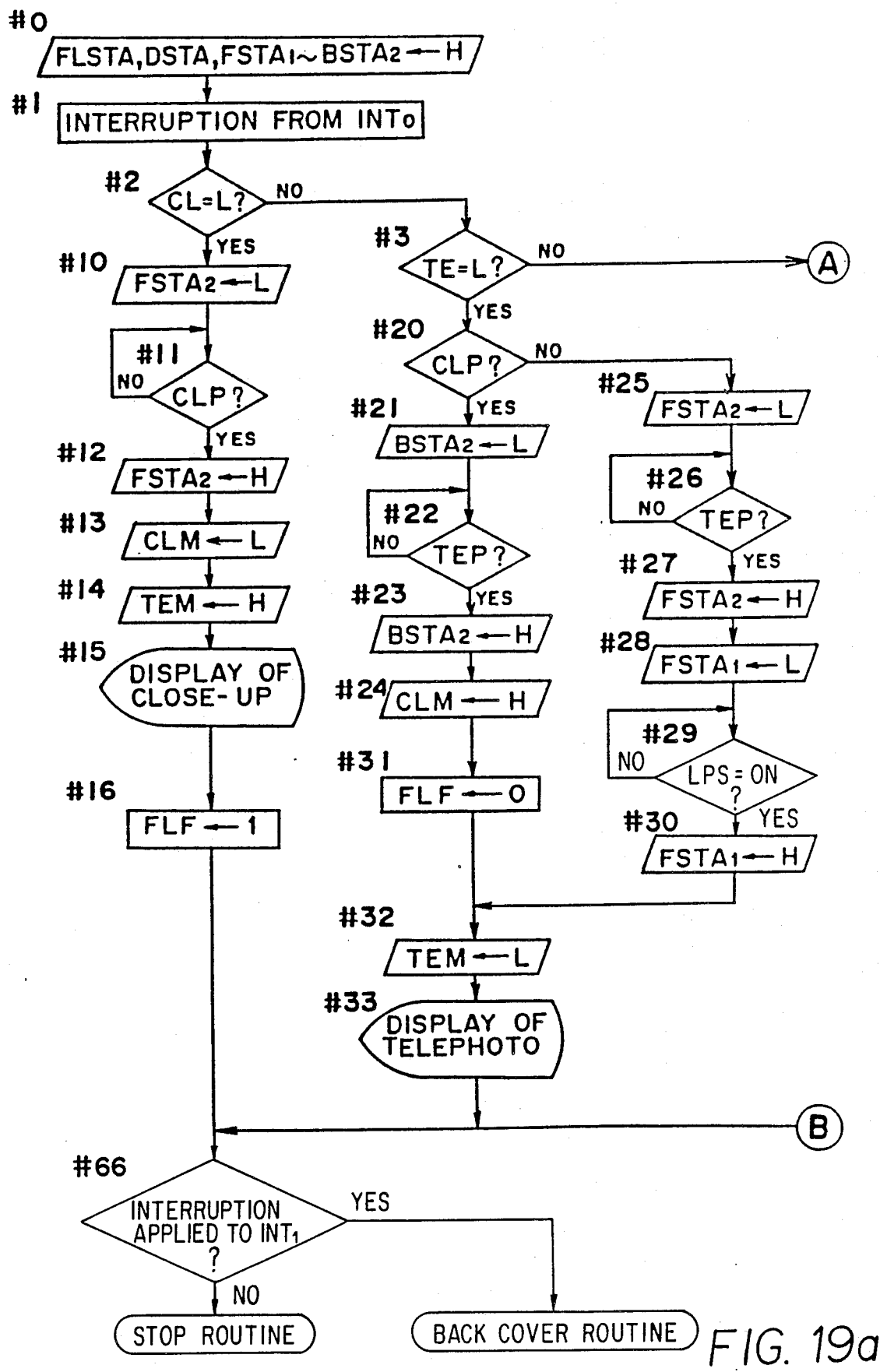
FIGS. 19a and 19b which are continuous onto each other, are a flow-chart illustrating a switching of the photographing mode.
Figure 19B:
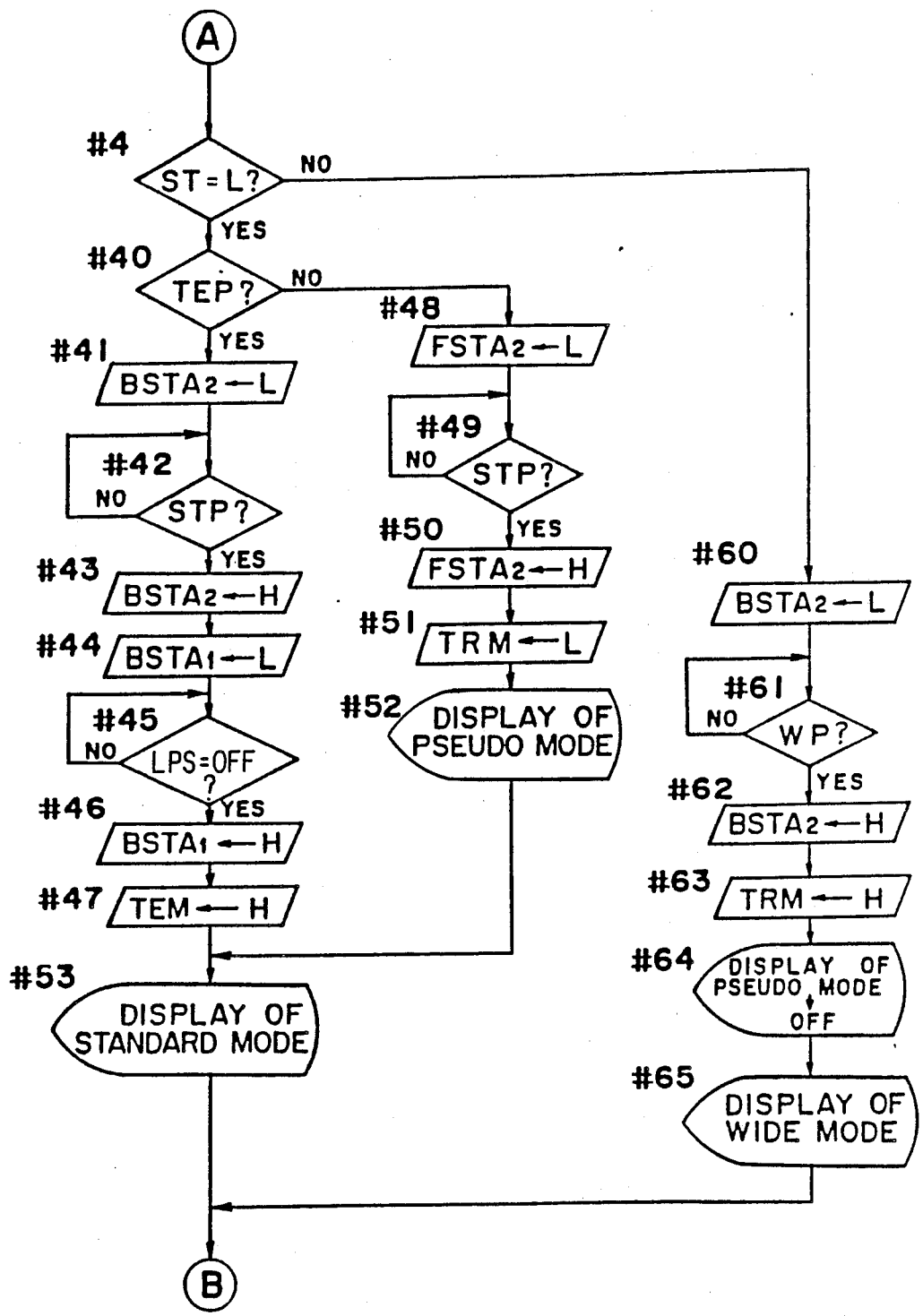

Hereinafter, the operation of the embodiment will be described with reference to FIGS. 19a and 19b which are continuous onto each other and illustrate a flowchart illustrating the switching of the photographing mode by means of the switching lever 1.

The switching of the photographing mode is initiated when an interruption signal which is an "L" pulse is inputted to the interruption terminal INT0 of the microcomputer MC. More specifically, when outputs from the code plates ST, TE and CL along which the slide brush BL operatively associated with the switching lever 1 slides are caused to change, one of the pulse generators PG0, PG1 and PG2 generates an "H" pulse causing the AND circuit AN0 to generate the "L" pulse which is in turn applied as the interruption signal to the interruption terminal INT0. In response to the application of the interruption signal to the interruption terminal INT0, the program flow shown in FIGS. 19a and 19b starts at step #0. During this step #0, all of the output terminals FLSTA, DSTA, FSTA1, BSTA1, FSTA2 and BSTA2 of the microcomputer MC are rendered to be "H" so that, in the event that the interruption is effected during the operation in which voltage to be used for flashing is boosted, the switching of the photographing lens and the finder switching operation, these operations can be interrupted.

Subsequently, and at step #1, the interruption from the interruption terminal INT0 is permitted even during the switching of the photographing mode, thereby proceeding to step #2. At step #2, a decision is made to determine whether or not the output signal from the third code plate CL indicates that the close-up mode have been selected. In case of the close-up mode, the output signal from the third code plate CL is "L" and, therefore, the program flow proceeds to step #10 at which the output terminal FSTA2 of the microcomputer MC is rendered to be "L" while the finder is switched to a high magnification state appropriate to the close-up mode. Then, a wait condition takes place at step #11 to enable the close-up state CLP shown in Table 1 to be established, followed by step #12 at which the output terminal FSTA2 of the microcomputer MC is rendered to be "H" to enable the switching of the finder to be released. Thereafter, and at step #13, the output terminal CLM of the microcomputer MC is rendered to be "L" indicating to the automatic focusing unit AF that the photographing mode is selected to be the close-up mode, followed by step #14 at which the output terminal TEM is rendered to be "H" to release an signal representative of the telephoto mode and, at step #15, the liquid crystal display unit DSP provides a display descriptive of the close-up mode. At subsequent step #16, a flash flag FLF is set to "1" in readiness for the actual photographing under a flash lighting condition, and the program flow proceeds to step #66. If the photographing mode is at this time switched onto the close-up mode, no switching of the photographing lens is required because the switching takes place from the telephoto mode wherein the photographing lens is always in a high magnification state.

Unless the result of decision at step #2 indicates that the output signal from the third code plate CL is "L", a decision at step #3 takes place to determine if the output signal from the fourth code plate TE is "L", that is, if the photographing mode is the telephoto mode. In the case where the telephoto mode is selected, the output signal from the fourth code plate TE is "L" and, in such case, the program flow proceeds to step #20 at which a decision is made to determine if it is the close-up state CLP. If the result of the decision at step #20 indicates "yes", this means that the photographing mode is switched from the close-up mode onto the telephoto mode and, therefore, the output terminal BSTA2 is rendered to be "L" at subsequent step #21 so that the finder is switched to the low magnification state appropriate to the telephoto mode, followed by a wait condition at step #22 which continues until the telephoto state TEP can be established. Subsequent to the establishment of the telephoto state TEP, the program flow proceeds to step #23 at which the output terminal BSTA2 is rendered to be "H" s that the finder switching operation can be released, followed by step #24 at which the output terminal CLM indicative of the close-up mode is rendered to be "H" so that the close-up mode can be released. At step #31, the flash flag FLF is reset to "0", and at step #32 the output terminal TEM indicative of the telephoto mode is rendered to be "L" so that the telephoto mode can be transmitted. At step #33, the telephoto mode is displayed by the liquid crystal display unit DSP, and the program flow then proceeds to step #66. In this way, even where the close-up mode is switched over to the telephoto mode, the photographing lens need not be switched since it has been set in the high magnification state during the close-up mode.

If the result of decision at step #20 indicates that it is not the close-up state CLP, this means that the telephoto mode has been switched over from the standard mode and, therefore, step #25 takes place at which the output terminal FSTA2 of the microcomputer MC is rendered to be "L" so that the finder can be switched over from the low magnification state for the standard mode onto the high magnification state for the telephoto mode, followed by a wait condition at step #26 which continues until the telephoto state TEP is established. Upon the establishment of the telephoto state TEP, step #27 takes place at which the output terminal FSTA2 is rendered to be "H" so that the finder switching operation can be released. At subsequent step #28, the output terminal FSTA1 is rendered to be "L" so that the photographing lens can be switched over from the low magnification state appropriate to the standard mode onto the high magnification state appropriate to the telephoto mode, followed by step #29 at which a wait condition takes place until the lens position switch LPS is closed. Subsequent to the closure of the lens position switch LPS, the output terminal FSTA1 is rendered to be "H" so that the lens switching operation can be released, followed by step #32.

If the result of decision at step #3 indicates that the output signal from the fourth code plate TE is not "L" signifying that the photographing mode is not the telephoto mode, step #4 takes place to determine if the output signal from the second code plate ST is representative of the standard mode. When the output signal from the second code plate ST is "L", this means that the standard mode is selected and, therefore, the program flow proceeds to step #40 at which a decision is made to determine if it is the telephoto state TEP. If the result of decision at step #40 is "yes", the output terminal BSTA2 of the microcomputer MC is rendered to be "L" at step #41 so that the finder can be switched over from the high magnification state for the telephoto mode onto the low magnification state for the standard mode, followed by step #42 at which a wait condition takes place until the standard state STP is established. Subsequent to the establishment of the standard state STP, the output terminal BSTA2 is rendered to be "H" at step #43 so that the finder switching operation is released, and at step #44, the output terminal BSTA1 is rendered to be "L" so that the photographing lens can be switched onto the low magnification state, followed by step #45 at which a wait condition takes place until the lens position switch LPS is opened. When the lens position switch LPS is opened, the output terminal BSTA1 is rendered to be "H" at step #46 so that the lens switching operation can be released, and at subsequent step #47, the output terminal TEM is rendered to be "H" so that the telephoto mode can be released, followed by step #53 at which the standard mode is indicated by the liquid crystal display unit DSP. Thereafter, the program flow proceeds to step #66.

If the result of decision at step #40 indicates that it is not the telephoto state, this means that the standard mode has been switched from the wide-angle mode and the program flow proceeds to step #48 at which the output terminal FSTA2 is rendered to be "L", so that the finder can be switched over from the low magnification state for the wide-angle mode onto the high magnification state appropriate to the standard mode. Then, at step #49, a wait condition takes place until the standard state STP is established. Subsequent to the establishment of the standard state STP, the output terminal FSTA2 is rendered to be "H" at step #50 so that the finder switching operation can be released, followed by step #51 at which the output terminal TRM of the microcomputer MC is rendered to be "L" so that the pseudo focal length photographing mark can be imprinted. At step #52, the liquid crystal display unit DSP displays that the pseudo focal length photographing mode has been set, and the program flow then proceeds to step #53.

Should the result of decision at step #4 indicate that the output signal from the second code plate ST is not "L", this means that the wide-angle mode has been switched from the standard mode, and, therefore, the program flow proceeds to step #60 at which the output terminal BSTA2 of the microcomputer MC is rendered to be "L" so that the finder can be switched over from the high magnification state for the standard mode onto the low magnification state for the wide-angle mode, followed by a wait condition at step #61 which continues until the wide-angle state WP is established. Subsequent to the establishment of the wide-angle state WP, the output terminal BSTA2 is rendered to be "H" at step #62 to release the finder switching operation, and at step #63, the output terminal TRM is rendered to be "H" so that the imprinting of the pseudo focal length photographing mark can be released. Thereafter, the display of the pseudo focal length photographing mode by the liquid crystal display unit DSP is released at step #64, followed by the display of the wide-angle mode at step #65. The program flow then proceeds to step #66.

At step #66, a decision is made to determine whether or not the interruption signal is applied to the interruption terminal INT1 to which the output from the fourth pulse generator PG3 shown in FIG. 13 is applied through the inverter IN0. That is, this interruption is initiated in response to both of the opening and closure of the back cover switch BCS adapted to be opened and closed in response to the opening and closure of the back cover of the camera. Specifically, if the interruption signal is applied to the interruption terminal INT1 as a result of the manipulation of the back cover during the execution of the program flow from step #0 to step #66, a back cover routine shown in FIG. 20 is executed, but if it is not, a STOP routine shown in FIG. 21c is executed.

Figure 20:
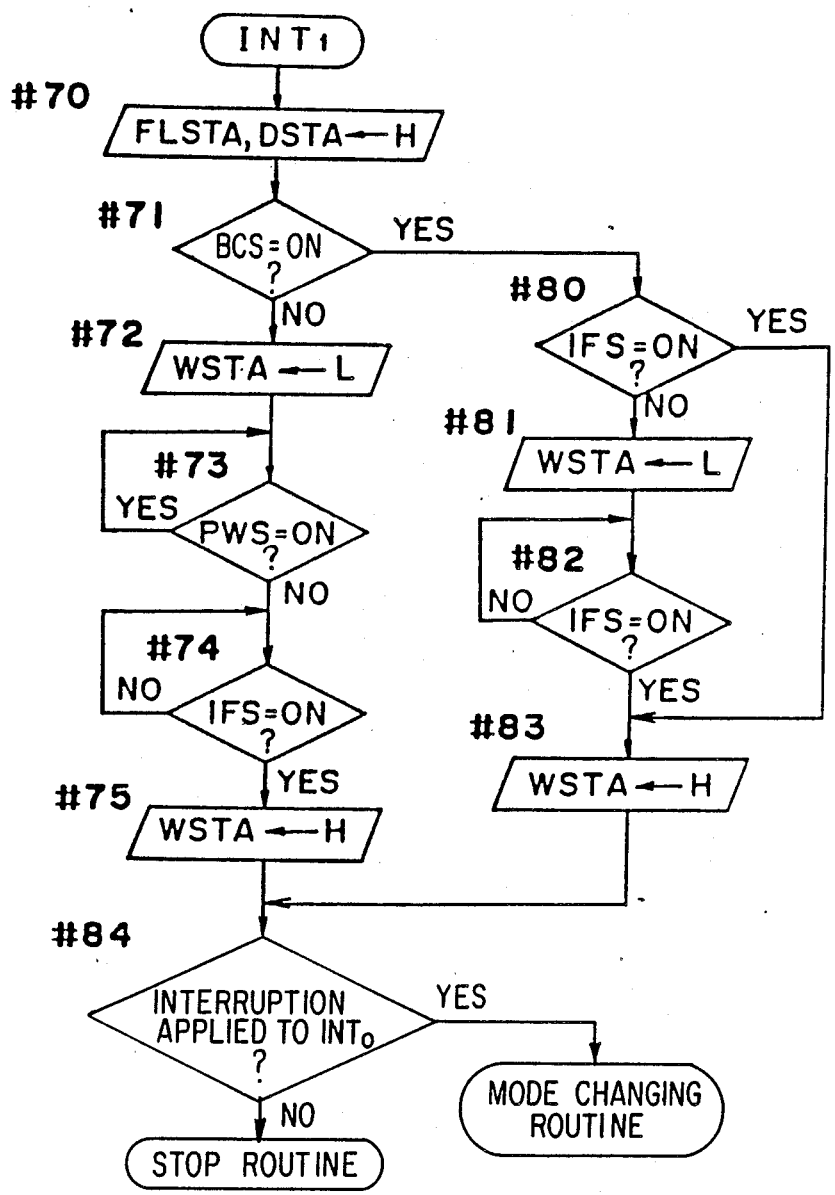
FIG. 20 is a flow-chart illustrating a back cover routine.

Referring now to FIG. 20 illustrating the back cover routine, when the interruption signal is applied to the interruption terminal INT1 of the microcomputer MC as a result of the manipulation of the back cover, both of the output terminals PLSTA and DSTA of the microcomputer MC are rendered to be "H" at step #70 so that the voltage boosting operation and the charge completion detecting operation of the flash circuit FL can be interrupted. At subsequent step #71, a division made to determine whether or not the back cover switch BCS is closed. If the back cover switch BCS is opened, this means that the back cover is closed and, therefore, the program flow proceeds to step #72 at which the output terminal WSTA is rendered to be "L" so that the film winding motor FWM shown in FIG. 13 can be driven in a direction required to wind the film. At subsequent step #73, a wait condition takes place, while the film is being wound, until the preparatory winding switch PWS is opened. Upon the opening of the preparatory winding switch PWS, a wait condition takes place at step #74 until the one frame switch 1FS is closed. Subsequent to the closure of the one frame switch 1FS, the microcomputer MC renders the output terminal WSTA to be "H" so that the film winding can be interrupted. During the execution of the program flow from step #72 to step #75, the preparatory winding of the film over a length of film corresponding to three frames can be wound up.

Should the result of decision at step #71 indicate that the back cover switch BCS is closed, this means that the back cover is opened and, therefore, the program flow proceeds to step #80 at which a decision is made to determine if the one frame switch 1FS is closed. Since the one frame switch 1PS is closed in the case where the film winding completes, when the result of decision at step #80 indicates that the one frame switch 1FS is not closed, this means that the film winding has not yet completed, that is, the film is not tensioned and therefore, the output terminal WSTA of the microcomputer MC is rendered to be "L" so that the film winding motor FWM can be driven in a direction required to complete the film winding. When the closure of the one frame switch 1FS is detected at step #82, the output terminal WSTA is rendered to be "H" at step #83 so that the film winding can be interrupted. Thus, unless the film winding is completed by reason of the tensioning of the film, the winding of the film remaining at the time the back cover is opened is effected and a mechanism therefor is consequently charged.

The program flow then proceeds from step #75 or step #83 to step #84 at which a decision is made to determine if, as a result of the manipulation of the switching lever 1 shown in FIG. 1 during the execution of the program flow from step #70 to step #84, the interruption signal is applied to the interruption terminal INT0. Should the result of decision at step #84 indicate that the interruption signal is applied to the interruption terminal INT0, the program flow returns to the mode changing routine shown in FIGS. 19a and 19b, but if it does not, the STOP routine shown in FIG. 21c takes place.

Figure 21A:
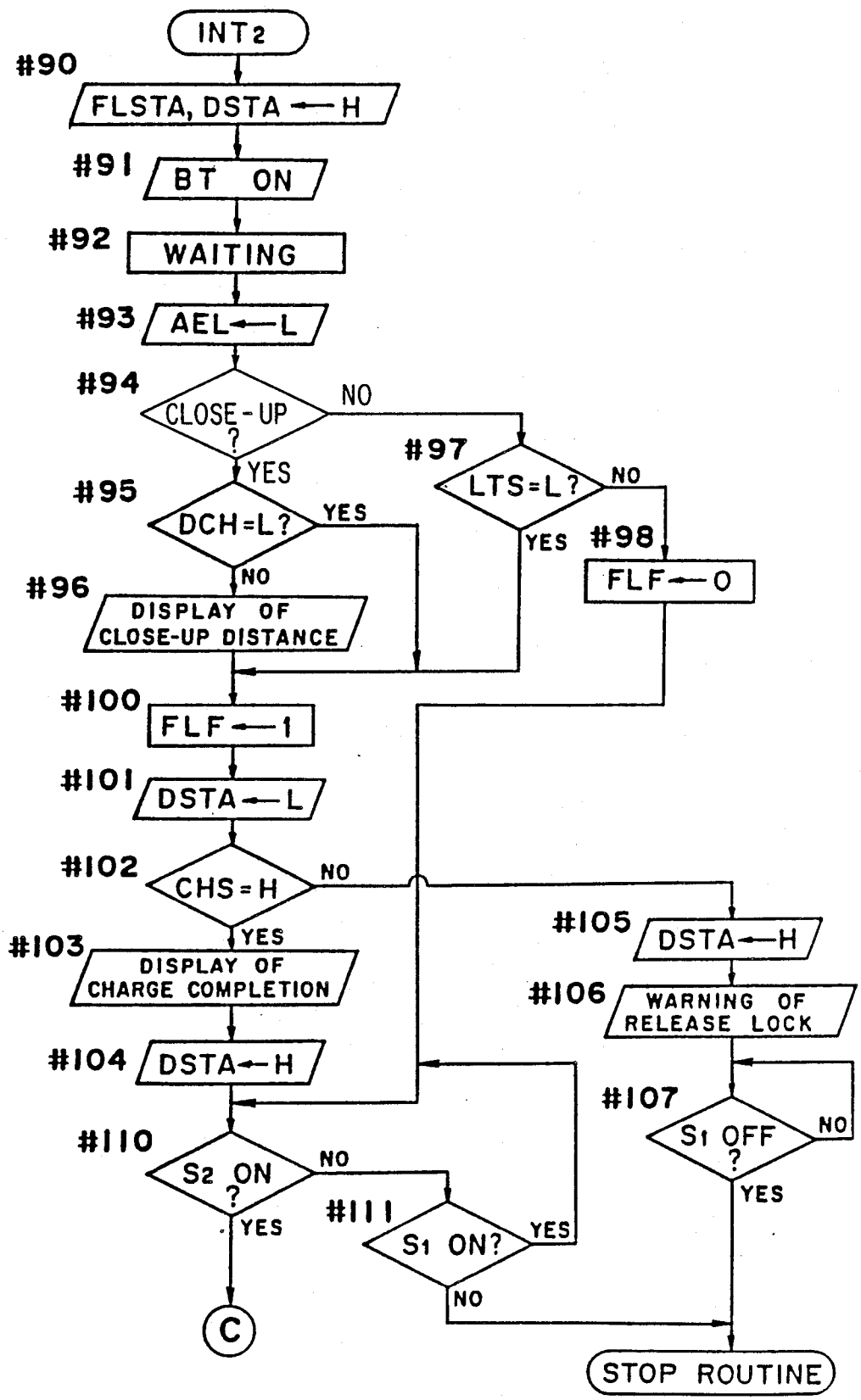
FIGS. 21a, 21b and 21c which are continuous onto one another, are a flow-chart illustrating an exposure routine, winding routine and rewindng routine.
Figure 21B:
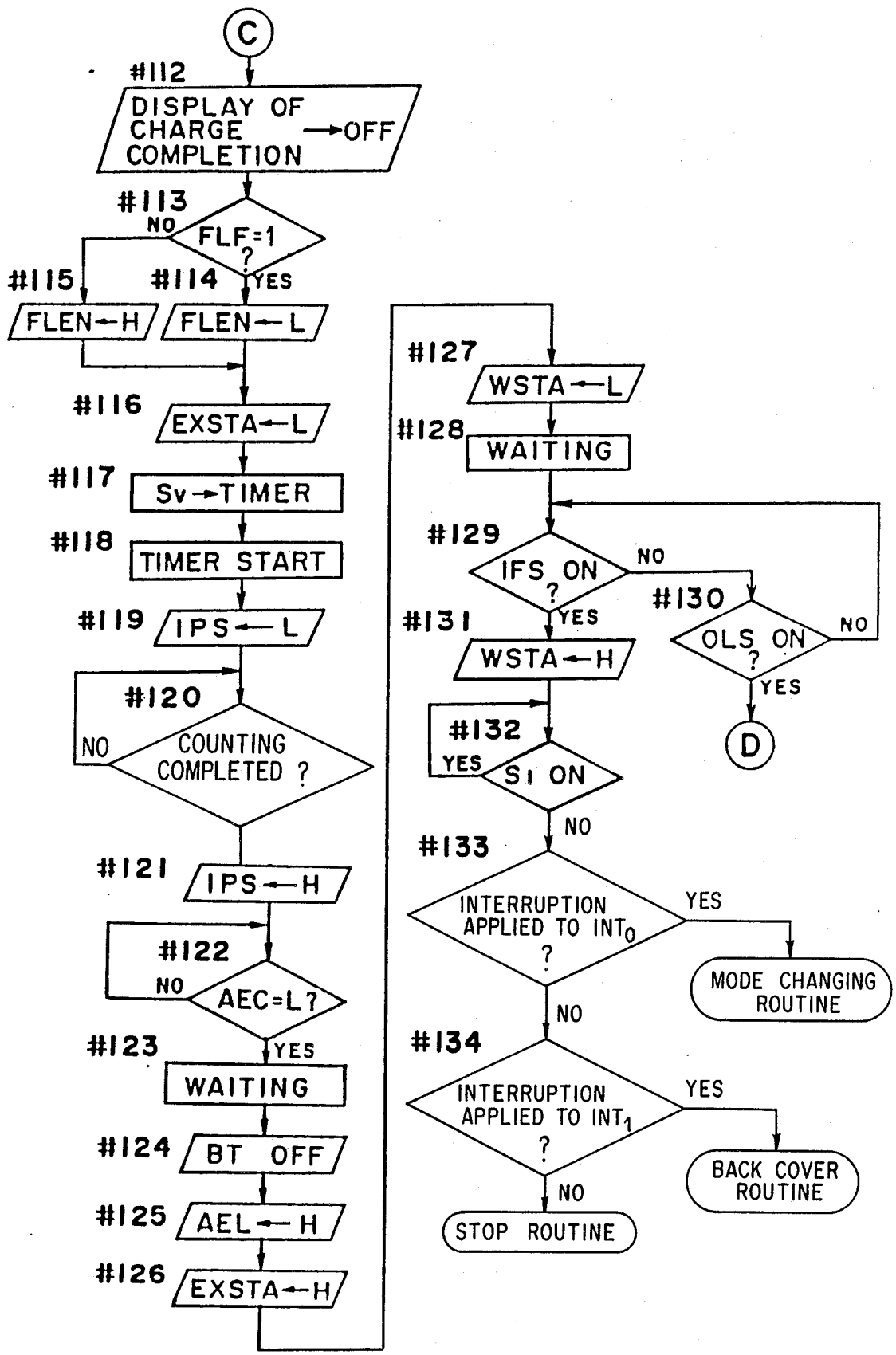
Figure 21C:
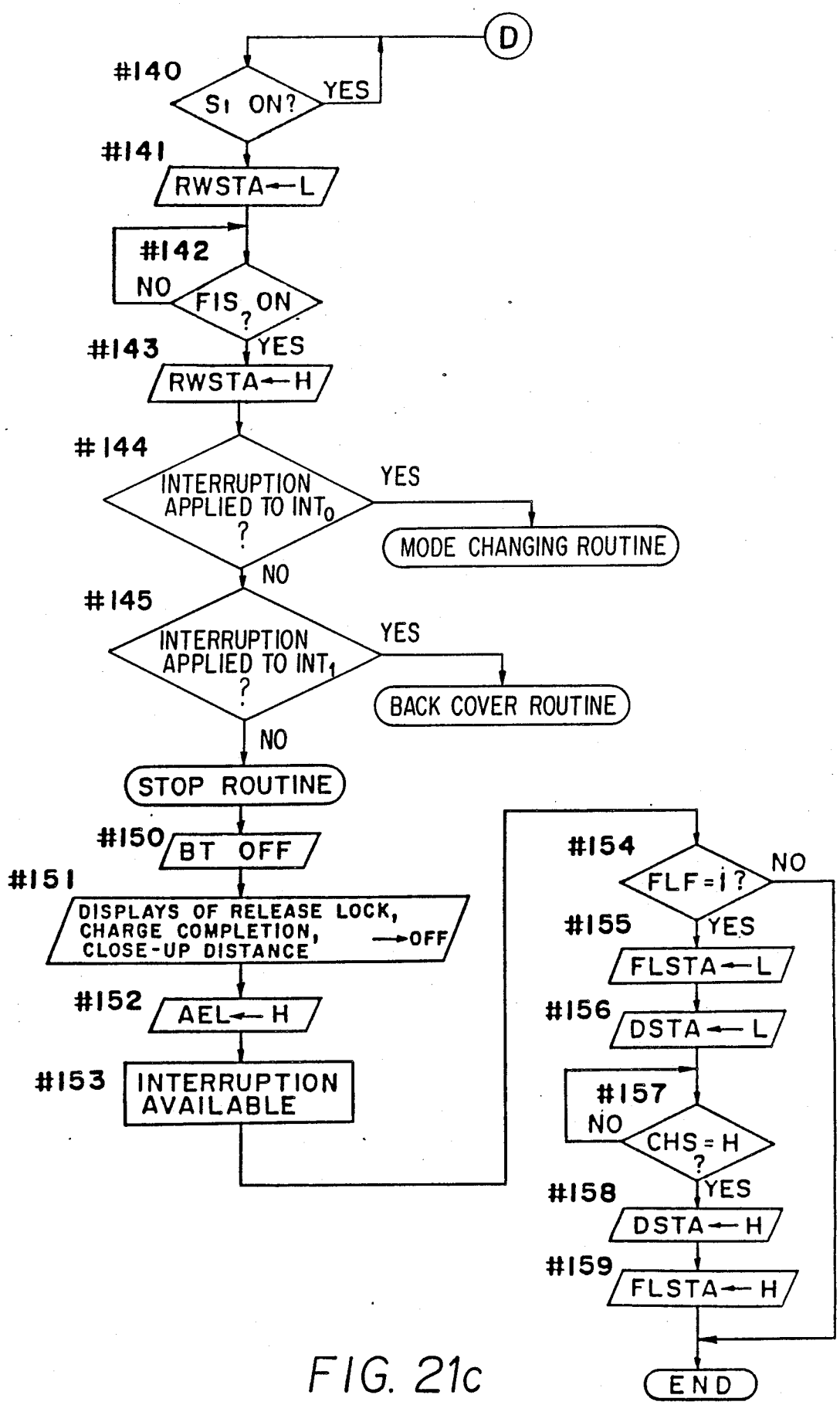

Referring next to FIGS. 21a through 21c, a routine for the exposure, winding and rewinding according to this embodiment will be explained hereinafter.

This routine is initiated by the interruption signal applied to the interruption terminal INT2 of the microcomputer MC through the closure of the light measuring switch S1 shown in FIG. 13. The light measuring switch S1 is closed at the first step of the depression of the shutter release button 9 shown in FIG. 1.

Firstly, when the interruption signal is inputted, both of the output terminals FLSTA and DSTA of the microcomputer MC are rendered to be "H" at step #90, the voltage boosting operation and the charge completion detecting operation in the flash circuit FL are interrupted. Subsequently, at step #91, the output terminal PWC of the microcomputer MC is rendered to be "L" so that the transistor BT becomes conductive and it is commenced to supply, through the line (+V), the electric power to the film sensitivity reading circuit ISD, D-A converter DA, release circuit RLC, exposure control circuit AE, automatic focusing unit AF, automatically control flash timer FMT, release lock warning element RLW, charge completion display element CHC and close-up distance display element DW, as shown in FIG. 13.

A wait condition takes place at step #92 during a predetermined period required for stabilization of the light measuring circuit contained in the exposure control circuit AE, and thereafter at step #93, the output terminal AEL of the microcomputer MC is rendered to be "L" so that the measured light value is subjected at this moment to the AE-lock. It is judged at step #94 whether or not the close-up mode is set. In case of the close-up mode, the program flow proceeds to step #95 at which it is judged whether or not the object to be photographed is located at the position suitable for the close-up photography by judging the signal of the input terminal DCH of the microcomputer MC inputted from the automatic focusing unit AF. In the case where the object is located at the distance suitable for the close-up photography, since the input terminal DCH is not "L", the program flow proceeds to step #96 to execute the display of the close-up distance display element DW. If the input terminal DCH of the microcomputer MC is "L" at step #95, none of the display is executed by the close-up distance display element DW due to the fact that the object is located at a distance unsuitable for the close-up photography.

In the case where the close-up mode is not set at step #94, the program flow proceeds to step #97 at which it is judged whether or not the shutter speed is restricted by its lowest value through the judgment by the microcomputer MC whether or not the signal of the input terminal LTS inputted from the exposure control circuit AE is "L". Unless the shutter speed is restricted by its lowest value, the program flow proceeds to step #98 at which "0" is reset into the flash flag FLF which is set to "1" in the flash photography and in the case where the shutter speed is restricted by its lowest value, since the input terminal LTS is "L", the program flow proceeds to step #100 to execute the flash photography.

More specifically, in the close-up mode or in the case where the shutter speed is restricted by its lowest value in either of the modes other than the close-up mode, the flash photography is executed. At step #100, the flash flag FLF is set "1" for the flash photography and at step #101, the output terminal DSTA of the microcomputer MC is rendered to be "L" so that it is commenced to detect whether or not the main capacitor in the flash circuit FL for the flash photography has been completed. It is judged at step #102 whether or not the main capacitor has been completely charged through the judgment b the microcomputer MC with respect to the signal applied to the input terminal CHS thereof. In the case where the input terminal CHS is "H" at step #102, since the main capacitor has been completely charged, the program flow proceeds to step #103 at which the charge completion is displayed by the charge completion display element CHC. Thereafter, at step #104, the charge completion detecting operation is released by resetting the output terminal DSTA to be "H".

Unless the input terminal CHS is "H" at step #102, since the main capacitor of the flash circuit FL has not been completely charged, the program flow proceeds to step #105 at which the output terminal DSTA of the microcomputer MC is rendered to be "H" so that the charge completion detecting operation is released. Thereafter, the warning is executed by the release lock warning element RLW at step #106 and a wait condition takes place until the light measuring switch S1 is turned off at step #107. When the light measuring switch S1 has been turned off at step #107, the program flow proceeds to the STOP routine as shown in FIG. 21c.

On the other hand, the program flow proceeds from step #104 to step #110 and at steps #110 and #111, a wait condition continues until the release switch S2 is turned on in the state where the light measuring switch S1 is kept on. Hereupon, in the case where the flash photography is not executed, the program flow directly proceeds to step #110 from step #98.

When the release switch S2 has been turned on at step #110, the program flow proceeds to step #112 so that the display caused by the charge completion display element CHC is turned off. Subsequently, it is judged at step #113 if the flash photography is executed by judging whether or not the flash flag FLF is set to "1". Hereupon, since the flash flag FLF is set to "1" in case of the flash photography, the program flow proceeds to step #114 at which the automatically control flash time FMT is allowed to execute the flash photography by causing the output terminal FLEN of the microcomputer MC to be "L". In the case where the flash photography is not executed, since the flash flag FLF is not set to "1", the program flow proceeds to step #115 at which the output terminal FLEN of the microcomputer MC is rendered to be "H" so that the flash photography is prohibited.

Thereafter, at step #116, the output terminal EXSTA is rendered to be "L" so that the photographing operation is initiated by the release circuit RLC, exposure control circuit AE and automatic focusing unit AF, and at step #117, the data corresponding to the value Sv of the film sensitivity read by the film sensitivity reading circuit ISD is set in the data printing period control timer contained in the microcomputer MC. The aforementioned timer starts at step #118 followed by step #119 as shown in FIG. 21b.

The output terminal IPS of the microcomputer MC is rendered to be "L" at step #119 so that the printing of the data is initiated by the data printing unit DAIP disposed on the back cover, or in the case where the pseudo focal length photographing mode is designated, the printing of the pseudo focal length photographing mark is initiated by the printing circuit TRIP thereof. Then, at step #120, a wait condition takes place until the counting is completed by the timer set at step #117 and when the counting has been completed, the program flow proceeds to step #121 at which the output terminal IPS is rendered to be "H" to enable the printing to be completed.

Subsequently, at step #122, the microcomputer MC is kept waiting until the output terminal AEC of the exposure control circuit AE which is rendered to be "L" in compliance with the commencement of the shutter closing operation is turned to be "L", and when this output terminal AEC is turned to be "L", the microcomputer MC is kept waiting during a predetermined period required for the closure of the shutter at step #123 followed by step #124. At step #124, the output terminal PWC of the microcomputer MC is rendered to be "L" so that the transistor BT is becomes non-conductive to stop the electric supply from the line (+V).

Furthermore, the output terminal AEL of the microcomputer MC is reset to "H" at step #125 to enable the releasement from the AE-lock and the output terminal EXSTA is reset to "H" at step #126 to enable the release magnet RM to be de-energized and the output terminal WSTA is rendered to be "L" at step #127 so that the film is wound up by driving the film winding motor FWM in a direction required to complete the film winding. After the microcomputer MC has been kept waiting at step #128 during a predetermined period required for opening the one frame switch 1FS from the closed state thereof, the program flow proceeds to step #129 at which it is judged whether or not the one frame switch 1FS has been turned on. Simultaneously with this procedure, it is judged by the microcomputer MC at step #130 whether or not the overload detecting switch OLS is turned on.

Upon detection of the closure of the one frame switch 1FS, since the film winding has been normally completed by one frame, the output terminal WSTA is reset to "H" at step #131 to enable the film winding operation to be released. At subsequent step #132, the microcomputer MC is kept waiting until the light measuring switch S1 is turned off and when the light measuring switch S1 has been turned off, it is judged at step #133 whether or not the interruption terminal INT0 is applied with the interruption signal. At this moment, if the interruption signal has been inputted into the interruption terminal INT0, the program flow proceeds to the mode changing routine as shown in FIGS. 19a and 19b, and if the interruption signal has not been inputted, the program flow proceeds to step #134 at which it is judged if the interruption signal has been applied to the interruption terminal INT1. When the interruption signal has been applied to the interruption terminal INT1 at step #134, the program flow proceeds to the back cover routine as shown in FIG. 20, and when the interruption signal has not been inputted, the program flow proceeds to the STOP routine which starts from step #150.

When it has been judged at step #130 that the overload detecting switch OLS is kept on, this means that the film is tensioned and therefore, a wait condition takes place at step #140 which continues until the light measuring switch S1 is turned off. When the light measuring switch S1 has been turned off, the output terminal RWSTA of the microcomputer MC is rendered to be "L" at step #141 so that the film winding motor FWM is driven in a direction required to rewind the film. Thereafter, the microcomputer MC is kept waiting at step #142 until the film detecting switch FIS is turned on, and since the film detecting switch FIS is turned on at the time of completion of the film rewinding, the program flow proceeds to step #143 at which the output terminal RWSTA of the microcomputer MC is reset to "H" so that the rewinding operation of the film is completed.

Subsequently, it is judged at step #144 whether or not the interruption signal has been applied to the interruption terminal INT0, and when the interruption signal has been inputted, the program flow proceeds to the mode changing routine shown in FIGS. 19a and 19b. If the interruption signal has not been applied to the interruption terminal INT0, it is judged at step #145 whether or not the interruption signal has been inputted into the interruption terminal INT1. When the interruption signal has been inputted, the program flow proceeds to the back cover routine as shown in FIG. 20. Unless the interruption signal has been inputted at step #145, the program flow proceeds to the STOP routine which starts from step #150.

Lastly, the STOP routine will be explained hereinafter.

In the STOP routine, the output terminal PWC of the microcomputer MC is firstly rendered to be "H" at step #150, thereby causing the transistor to be in non-conductive state in order to stop the electric supply from the line (+V). Then, the displays of the release lock warning element RLW, charge completion display element CHC and close-up distance display element DW are turned off at step #151 and the output terminal AEL of the microcomputer MC is rendered to be "H" at step #152 so that the AE-lock caused by the exposure control circuit AE is released. At step #153, the interruption which is caused by the interruption signal from each of the interruption terminal INT0, INT1 and INT2 is permitted, and it is judged at step #154 whether or not the flash flag FLF is set to "1" for the flash photography.

Hereupon, although the operation is completed unless the flash flag FLF is set to "1", in the case where the flash flag FLF is set to "1", the output terminal FLSTA of the microcomputer MC is rendered to be "L" at step #155 so that the voltage boosting for charging the main capacitor in the flash circuit FL is initiated, and at subsequent step #156, the charge completion is detected by rendering the output terminal DSTA to be "L". Then, at step #157, the output terminal CHS of the flash circuit FL is rendered to be "L" and a wait condition takes place until the main capacitor is completely charged. When the main capacitor has been completely charged, the output terminal DSTA is rendered to be "H" at step #158 to enable the charge completion detecting operation to be released, and the output terminal FLSTA is rendered to be "H" at step #159 to enable the voltage boosting operation to be released, thus resulting in the completion of a series of the operation.

It is to be noted here that although the range which can be reproduced on a print is restricted to one kind in the case where the pseudo focal length photographing mode is designated in this embodiment, the present invention is not limited thereby, but may be modified in such a construction that the range which can be reproduced on a print can be switched to one of a plurality of the ranges so as to record plural bits of the pseudo focal length photographing informations onto the film.

It is further to be noted that in the above described embodiment, although the switching of the focal lengths of the photographing lens and the fact whether or not the pseudo focal length photographing mode is designated are associated with each other, the present invention is not limited thereby, but is applicable not only to the photographic camera having the photographing lens of a fixed focal length, but also to the photographic camera which is not provided with the real focal length photographing mode but only the pseudo focal length photographing mode.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A photographic camera having a real focal length photographing mode in which a normal range in a frame of a film will be printed on the photographing paper and a pseudo focal length photographing mode in which a range smaller than the normal range in a frame of the film will be printed on a photographic paper, said photographic camera comprising:

a mode selecting means for selecting one of said real focal length photographing mode and said pseudo focal length photographing mode;

means for winding the film by an identical length for every shot regardless of the selection of the photographing mode by said selecting means; and a light shielding means for shielding at least a portion of the normal range in a frame of the film in the case where said pseudo focal length photographing mode was selected, said portion being limited to a portion of said film which is not to be utilized upon printing.

2. A photographic camera as claimed in claim 1, further comprising a recording means for recording an information related to the selected mode within the range shielded by said light shielding means.

3. A photographic camera comprising:
means for winding a film by an additional length for every shot; and
means for shielding at least a portion of a normal range in a frame of the film, said portion being limited to a portion of the film which is not to be utilized upon printing.

4. A photographic camera as claimed in claim 3, wherein said shielding means is adapted to shield the upper portion of the normal range.

5. A photographic camera as claimed in claim 3, wherein said shielding means is adapted to shield the lower portion of the normal range.

6. A photographic camera comprising:
means for shielding the upper portion of a normal range in a frame of a film, said portion being limited to a portion of the film which is not to be utilized upon printing.

7. A photographic camera comprising:
means for shielding the lower portion of a normal range in a film, said portion being limited to a portion of the film which is not to be utilized upon printing.

8. A photographic camera comprising:
means for shielding at least a portion of a normal range in a frame of a film; and
means for imprinting data in the shielded portion in response to the photographing operation.

9. A photographic camera as claimed in claim 8, further comprising:
means for switching said imprinting means from active state to non-active state or from non-active state to active state.

10. A photographic camera as claimed in claim 9, wherein said switching means includes:
means for selecting a real focal length photographing mode in which the normal range in a frame of a film will be printed on a photographing paper and a pseudo focal length photographing mode in which a range smaller than the normal range in a frame of the film will be printed on a photographing paper;
means for allowing said imprinting means to imprint data when said selecting means selects the pseudo focal length photographing mode,
wherein data which said imprinting means imprints represents that the pseudo focal length photographing mode is selected.

* * * * *

UNITED STATES PATENT AND TRADEMARK OFFICE
CERTIFICATE OF CORRECTION

PATENT NO. : 4,928,124

DATED : May 22, 1990

INVENTOR(S) : Nobuyuki TANIGUCHI et al.

It is certified that error appears in the above-identified patent and that said Letters Patent is hereby corrected as shown below:

In column 29, line 18, delete "additional" and insert --identical--.

Signed and Sealed this

Seventeenth Day of March, 1992

Attest:

HARRY F. MANBECK, JR.

*Attesting Officer*   *Commissioner of Patents and Trademarks*